US011182377B2

(12) United States Patent
Lloyd et al.

(10) Patent No.: US 11,182,377 B2
(45) Date of Patent: Nov. 23, 2021

(54) SYSTEM AND GRAPHICAL USER INTERFACE FOR RECORD LIFECYCLE IMPROVEMENT

(71) Applicant: ServiceNow, Inc., Santa Clara, CA (US)

(72) Inventors: Matthew David Lloyd, Santa Clara, CA (US); Jamie Lynn Kulig, San Diego, CA (US); Valencio Cardoso, San Diego, CA (US); Aditya Mallik Manthripragada, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 701 days.

(21) Appl. No.: 16/125,055

(22) Filed: Sep. 7, 2018

(65) Prior Publication Data
US 2020/0082005 A1 Mar. 12, 2020

(51) Int. Cl.
*G06F 11/30* (2006.01)
*G06F 16/23* (2019.01)
*G06F 16/25* (2019.01)

(52) U.S. Cl.
CPC ........ *G06F 16/2379* (2019.01); *G06F 16/252* (2019.01)

(58) Field of Classification Search
None
See application file for complete search history.

(56) References Cited

U.S. PATENT DOCUMENTS

| 6,609,122 | B1 | 8/2003 | Ensor |
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,350,209 | B2 | 3/2008 | Shum |
| 7,610,512 | B2 | 10/2009 | Gerber |
| 7,617,073 | B2 | 11/2009 | Trinon |
| 7,689,628 | B2 | 3/2010 | Garg |

(Continued)

FOREIGN PATENT DOCUMENTS

KR 101623504 B1 5/2016

OTHER PUBLICATIONS

Bugzilla Documentation, Release 5.1.2+ (Feb. 16, 2018), p. 9.

*Primary Examiner* — Tuankhanh D Phan

(74) *Attorney, Agent, or Firm* — Fletcher Yoder PC

(57) ABSTRACT

A system may include (i) a database disposed within a computational instance of a remote network management platform that manages a managed network and (ii) server device(s) associated with the computational instance. The database is configured to store records related to issues with configuration items of the managed network, each record assigned to one of a plurality of states including: a first state for newly-opened records, a second state for records undergoing assessment, a third state for records undergoing root cause analysis, a fourth state for records with a fix in progress, a fifth state for resolved records, and a sixth state for closed records. Additionally, the server device(s) are configured to generate and provide graphical user interface panes to a client device associated with the managed network, each of the graphical user interface panes corresponding to one of the plurality of states for a particular record.

20 Claims, 18 Drawing Sheets

(56) References Cited

U.S. PATENT DOCUMENTS

| | | |
|---|---|---|
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,239,857 B2 | 1/2016 | Trinon |
| 9,535,737 B2 | 1/2017 | Joy |
| 9,557,969 B2 | 1/2017 | Sharma |
| 9,792,387 B2 | 10/2017 | George |
| 2012/0173927 A1* | 7/2012 | Rymeski ............. G06F 11/0748 714/26 |

\* cited by examiner

```
┌─────────────────────────────────────────────────────────────────────────┐
│ PROVIDE, BY A COMPUTING SYSTEM AND TO A CLIENT DEVICE ASSOCIATED WITH   │
│ A MANAGED NETWORK, A FIRST PANE FROM AMONG A PLURALITY OF GRAPHICAL     │
│ USER INTERFACE PANES, WHERE THE COMPUTING SYSTEM INCLUDES A DATABASE    │
│ DISPOSED WITHIN A COMPUTATIONAL INSTANCE OF A REMOTE NETWORK            │
│ MANAGEMENT PLATFORM THAT MANAGES THE MANAGED NETWORK, WHERE THE         │
│ DATABASE IS CONFIGURED TO STORE A PLURALITY OF RECORDS RELATED TO       │
│ ISSUES WITH CONFIGURATION ITEMS OF THE MANAGED NETWORK, EACH RECORD     │
│ ASSIGNED TO ONE OF A PLURALITY OF STATES INCLUDING: A FIRST STATE FOR   │── 1400
│ NEWLY-OPENED RECORDS, A SECOND STATE FOR RECORDS UNDERGOING             │
│ ASSESSMENT, A THIRD STATE FOR RECORDS UNDERGOING ROOT CAUSE ANALYSIS,   │
│ A FOURTH STATE FOR RECORDS WITH A FIX IN PROGRESS, A FIFTH STATE FOR    │
│ RESOLVED RECORDS, AND A SIXTH STATE FOR CLOSED RECORDS, WHERE EACH OF   │
│ THE GRAPHICAL USER INTERFACE PANES CORRESPONDS TO ONE OF THE PLURALITY  │
│ OF STATES FOR A PARTICULAR RECORD OF THE PLURALITY OF RECORDS, WHERE    │
│ THE FIRST PANE CORRESPONDS TO THE FIRST STATE, AND WHERE THE FIRST PANE │
│ REPRESENTS A UNIQUE IDENTIFIER OF THE PARTICULAR RECORD, A PRIORITY OF  │
│ THE PARTICULAR RECORD, A DESCRIPTION OF THE PARTICULAR RECORD, AND A    │
│ FIRST CONTROL CONFIGURED TO CAUSE THE PARTICULAR RECORD TO BE ASSIGNED  │
│ TO THE SECOND STATE                                                     │
└─────────────────────────────────────────────────────────────────────────┘
                                    ▼
┌─────────────────────────────────────────────────────────────────────────┐
│ PROVIDE, BY THE COMPUTING SYSTEM AND TO THE CLIENT DEVICE, A SECOND     │
│ PANE CORRESPONDING TO THE SECOND STATE, WHERE THE SECOND PANE           │
│ REPRESENTS THE UNIQUE IDENTIFIER, THE PRIORITY, THE DESCRIPTION, A      │── 1402
│ CATEGORY OF THE PARTICULAR RECORD, A SECOND CONTROL CONFIGURED TO       │
│ CAUSE THE PARTICULAR RECORD TO BE ASSIGNED TO THE THIRD STATE, AND A    │
│ THIRD CONTROL CONFIGURED TO CAUSE THE PARTICULAR RECORD TO BE           │
│ ASSIGNED TO THE SIXTH STATE                                             │
└─────────────────────────────────────────────────────────────────────────┘
                                    ▼
┌─────────────────────────────────────────────────────────────────────────┐
│ PROVIDE, BY THE COMPUTING SYSTEM AND TO THE CLIENT DEVICE, A THIRD      │
│ PANE CORRESPONDING TO THE THIRD STATE, WHERE THE THIRD PANE             │
│ REPRESENTS THE UNIQUE IDENTIFIER, THE PRIORITY, THE DESCRIPTION, THE    │── 1404
│ CATEGORY, A FIRST DIALOG BOX FOR ENTERING A SUMMARY OF A PARTICULAR     │
│ ISSUE ASSOCIATED WITH THE PARTICULAR RECORD, A FOURTH CONTROL           │
│ CONFIGURED TO CAUSE THE PARTICULAR RECORD TO BE ASSIGNED TO THE         │
│ FOURTH STATE, AND A FIFTH CONTROL CONFIGURED TO CAUSE THE PARTICULAR    │
│ RECORD TO BE ASSIGNED TO THE SIXTH STATE                                │
└─────────────────────────────────────────────────────────────────────────┘
                                    ▼
┌─────────────────────────────────────────────────────────────────────────┐
│ PROVIDE, BY THE COMPUTING SYSTEM AND TO THE CLIENT DEVICE, A FOURTH     │
│ PANE CORRESPONDING TO THE FOURTH STATE, WHERE THE FOURTH PANE           │
│ REPRESENTS THE UNIQUE IDENTIFIER, THE PRIORITY, THE DESCRIPTION, THE    │── 1406
│ CATEGORY, A SECOND DIALOG BOX FOR ENTERING A SUMMARY OF A SOLUTION      │
│ USED TO RESOLVE THE PARTICULAR ISSUE ASSOCIATED WITH THE PARTICULAR     │
│ RECORD, A SIXTH CONTROL CONFIGURED TO CAUSE THE PARTICULAR RECORD TO    │
│ BE ASSIGNED TO THE FIFTH STATE, AND A SEVENTH CONTROL CONFIGURED TO     │
│ CAUSE THE PARTICULAR RECORD TO BE ASSIGNED TO THE SIXTH STATE           │
└─────────────────────────────────────────────────────────────────────────┘
                                    ▼
┌─────────────────────────────────────────────────────────────────────────┐
│ PROVIDE, BY THE COMPUTING SYSTEM AND TO THE CLIENT DEVICE, A FIFTH      │
│ PANE CORRESPONDING TO THE FIFTH STATE, WHERE THE FIFTH PANE             │
│ REPRESENTS THE UNIQUE IDENTIFIER, THE PRIORITY, THE DESCRIPTION, THE    │── 1408
│ CATEGORY, A MENU FOR ENTERING A TYPE OF RESOLUTION FOR THE PARTICULAR   │
│ RECORD, AN EIGHTH CONTROL CONFIGURED TO CAUSE THE PARTICULAR RECORD     │
│ TO BE ASSIGNED TO THE SIXTH STATE, AND A NINTH CONTROL CONFIGURED TO    │
│ CAUSE THE PARTICULAR RECORD TO BE ASSIGNED TO THE THIRD STATE           │
└─────────────────────────────────────────────────────────────────────────┘
                                    ▼
┌─────────────────────────────────────────────────────────────────────────┐
│ PROVIDE, BY THE COMPUTING SYSTEM AND TO THE CLIENT DEVICE, A SIXTH      │
│ PANE CORRESPONDING TO THE SIXTH STATE, WHERE THE SIXTH PANE             │── 1410
│ REPRESENTS THE UNIQUE IDENTIFIER, THE PRIORITY, THE DESCRIPTION, AND    │
│ THE CATEGORY                                                            │
└─────────────────────────────────────────────────────────────────────────┘
```

FIG. 14

SYSTEM AND GRAPHICAL USER INTERFACE FOR RECORD LIFECYCLE IMPROVEMENT

BACKGROUND

Management of an enterprise's network may involve discovering issues with devices and/or configurations of the network and subsequently working to resolve these issues. For example, individual(s) at the enterprise could report that some devices encountered software defects, hardware defects, internet connectivity issues, printing issues, error messages, and/or phishing attempts, among others. In such situations, agents, such as information technology (IT) professionals, may be tasked to assist with resolution of at least some of the reported issues.

SUMMARY

Generally, an enterprise may rely on a remote network management platform to assist with management of the enterprise's network. For example, the platform may have a database containing incident records that include information about reported issues with devices and/or software of the enterprise. Also, the database may contain problem records that each respectively describes an issue commonly specified in one or more incident records. On this point, the database may contain link(s) between a given problem record and incident record(s) to which the given problem record is related according to the common issue. As such, a given problem record could assist with management of an issue reported in several incident records, such as by assisting with evaluation of a root cause of this issue and/or by assisting with more efficient resolution of this issue when it is encountered by many devices, among other possibilities.

Given this, enterprise software, such as a desktop or web-based application developed for usage by individual(s) associated with the enterprise's network, may include features that enable reporting of issues and provide access to the above-described incident records and/or problem records. Thus, the enterprise software may include features that agent(s) could use when assisting with resolution of reported issue(s).

Although enterprise software may include features that could assist with resolution of reported issue(s), such features might not be arranged to conform to workflow(s) often used within enterprise(s). In particular, a problem record could be programmatically assigned to and/or transition between various states each respectively representative of an event related to resolution of an issue described in the problem record. Yet, such states might not be representative of the actual events and/or sequence of events carried out in an enterprise to resolve an issue. For example, a problem record might be configured to merely transition between (i) a state representative of the problem record being open and (ii) a state representative of the problem record being closed. Yet, the actual sequence of events carried out in an enterprise to resolve an issue may involve other events (e.g., root cause analysis) beyond just initiating and ending resolution of an issue. Other examples are also possible.

Given this, agent(s) might face various challenges if they rely on a problem record that is not arranged according to their preferred workflow. For example, agent(s) might face difficulties in tracking which events have already been carried out with respect to resolution of an issue and which events have not yet been carried out with respect to resolution of this issue. In another example, different agent(s) might handle different events during management of a problem record, and thus agent(s) may face challenges with respect to tracking information about such different events. In yet another example, agent(s) might seek to maintain notes related to a specific event associated with resolution of an issue, so that agent(s) could refer to such notes before, during, and/or after this or another event is carried out with respect to this issue. Yet, even if the problem record includes a feature for entry of notes, such a note-taking feature may not be specific to any given event and thus may or may not be useful to agent(s). As result, agent(s) might instead maintain notes in a separate application, which may then inconveniently cause agent(s) to rely on time-consuming navigation between applications during resolution of the issue. Additionally or alternatively, agent(s) might rely on hand-written notes, which may be easily misplaced or lost, among other disadvantages. Thus, an improvement is desired.

The embodiments described herein relate to an improved graphical user interface (GUI) that may help overcome the above-described challenges while streamlining the process of resolving reported issues with an enterprise's managed network.

Specifically, the disclosed GUI may enable a problem record to be assigned to and/or transition between states that conform to workflow(s) commonly used within enterprises in various industries. Enabling use of such workflow(s) via the disclosed GUI may be beneficial to those leveraging the remote network management platform to assist with management of the enterprise's network.

In particular, the disclosed GUI may provide a GUI pane corresponding to a state for newly-opened records, a GUI pane corresponding to a state for records undergoing assessment, a GUI pane corresponding to a state for records undergoing root cause analysis, a GUI pane corresponding to a state for records with a fix in progress, a GUI pane corresponding to a state for resolved records, and a GUI pane corresponding to a state for closed records. Moreover, each pane may respectively include feature(s) that enable review and/or entry of notes and/or other information relevant to the state of the problem record.

Accordingly, a first example embodiment may involve a computing system including a database disposed within a computational instance of a remote network management platform that manages a managed network, where the database is configured to store a plurality of records related to issues with configuration items of the managed network, each record assigned to one of a plurality of states including: a first state for newly-opened records, a second state for records undergoing assessment, a third state for records undergoing root cause analysis, a fourth state for records with a fix in progress, a fifth state for resolved records, and a sixth state for closed records. The computing system also includes one or more server devices, associated with the computational instance, and configured to generate and provide graphical user interface panes to a client device associated with the managed network, each of the graphical user interface panes corresponding to one of the plurality of states for a particular record of the plurality of records, the graphical user interface panes including: a first pane corresponding to the first state, where the first pane represents a unique identifier of the particular record, a priority of the particular record, a description of the particular record, and a first control configured to cause the particular record to be assigned to the second state; a second pane corresponding to the second state, where the second pane represents the unique identifier, the priority, the description, a category of the particular record, a second control configured to cause the particular record to be assigned to the third state, and a third control configured to cause the particular record to be assigned to the sixth state; a third pane corresponding to the third state, where the third pane represents the unique identifier, the priority, the description, the category, a first dialog box for entering a summary of a particular issue associated with the particular record, a fourth control configured to cause the particular record to be assigned to the fourth state, and a fifth control configured to cause the particular record to be assigned to the sixth state; a fourth pane corresponding to the fourth state, where the fourth pane represents the unique identifier, the priority, the description, the category, a second dialog box for entering a summary of a solution used to resolve the particular issue associated with the particular record, a sixth control configured to cause the particular record to be assigned to the fifth state, and a seventh control configured to cause the particular record to be assigned to the sixth state; a fifth pane corresponding to the fifth state, where the fifth pane represents the unique identifier, the priority, the description, the category, a menu for entering a type of resolution for the particular record, an eighth control configured to cause the particular record to be assigned to the sixth state, and a ninth control configured to cause the particular record to be assigned to the third state; and a sixth pane corresponding to the sixth state, where the sixth pane represents the unique identifier, the priority, the description, and the category.

A second example embodiment may involve providing, by a computing system and to a client device associated with a managed network, a first pane from among a plurality of graphical user interface panes, where the computing system includes a database disposed within a computational instance of a remote network management platform that manages the managed network, where the database is configured to store a plurality of records related to issues with configuration items of the managed network, each record assigned to one of a plurality of states including: a first state for newly-opened records, a second state for records undergoing assessment, a third state for records undergoing root cause analysis, a fourth state for records with a fix in progress, a fifth state for resolved records, and a sixth state for closed records, where each of the graphical user interface panes corresponds to one of the plurality of states for a particular record of the plurality of records, where the first pane corresponds to the first state, and where the first pane represents a unique identifier of the particular record, a priority of the particular record, a description of the particular record, and a first control configured to cause the particular record to be assigned to the second state. The second example embodiment may also involve providing, by the computing system and to the client device, a second pane corresponding to the second state, where the second pane represents the unique identifier, the priority, the description, a category of the particular record, a second control configured to cause the particular record to be assigned to the third state, and a third control configured to cause the particular record to be assigned to the sixth state. The second example embodiment may additionally involve providing, by the computing system and to the client device, a third pane corresponding to the third state, where the third pane represents the unique identifier, the priority, the description, the category, a first dialog box for entering a summary of a particular issue associated with the particular record, a fourth control configured to cause the particular record to be assigned to the fourth state, and a fifth control configured to cause the particular record to be assigned to the sixth state. The second example embodiment may further involve providing, by the computing system and to the client device, a fourth pane corresponding to the fourth state, where the fourth pane represents the unique identifier, the priority, the description, the category, a second dialog box for entering a summary of a solution used to resolve the particular issue associated with the particular record, a sixth control configured to cause the particular record to be assigned to the fifth state, and a seventh control configured to cause the particular record to be assigned to the sixth state. The second example embodiment may yet further involve providing, by the computing system and to the client device, a fifth pane corresponding to the fifth state, where the fifth pane represents the unique identifier, the priority, the description, the category, a menu for entering a type of resolution for the particular record, an eighth control configured to cause the particular record to be assigned to the sixth state, and a ninth control configured to cause the particular record to be assigned to the third state. The second example embodiment may yet further involve providing, by the computing system and to the client device, a sixth pane corresponding to the sixth state, where the sixth pane represents the unique identifier, the priority, the description, and the category.

In a third example embodiment, an article of manufacture may include a non-transitory computer-readable medium, having stored thereon program instructions that, upon execution by a computing system, cause the computing system to perform operations in accordance with the first and/or second example embodiments.

In a fourth example embodiment, a computing system may include at least one processor, as well as memory and program instructions. The program instructions may be stored in the memory, and upon execution by the at least one processor, cause the computing system to perform operations in accordance with the first and/or second example embodiments.

In a fifth example embodiment, a system may include various means for carrying out each of the operations of the first and/or second example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 14 is a flow chart, in accordance with example embodiments.

DETAILED DESCRIPTION

Figure 1:
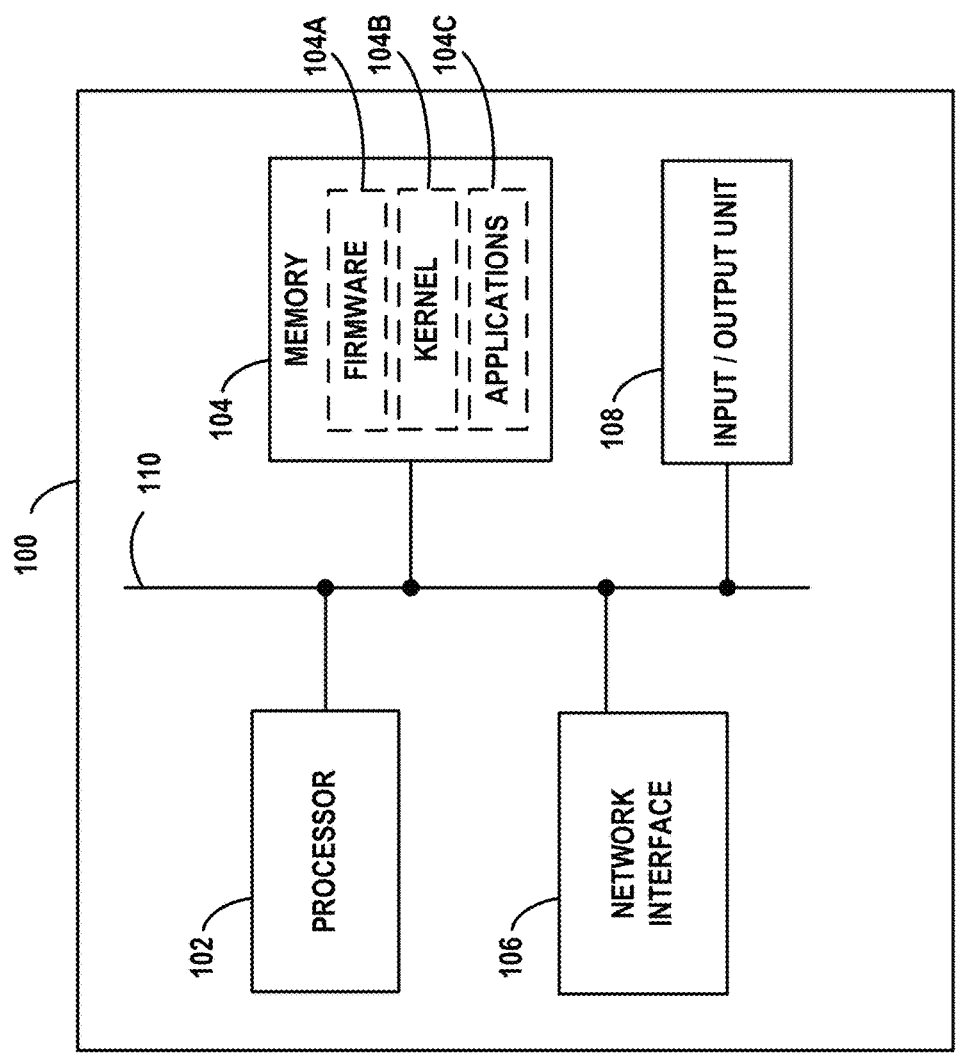
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
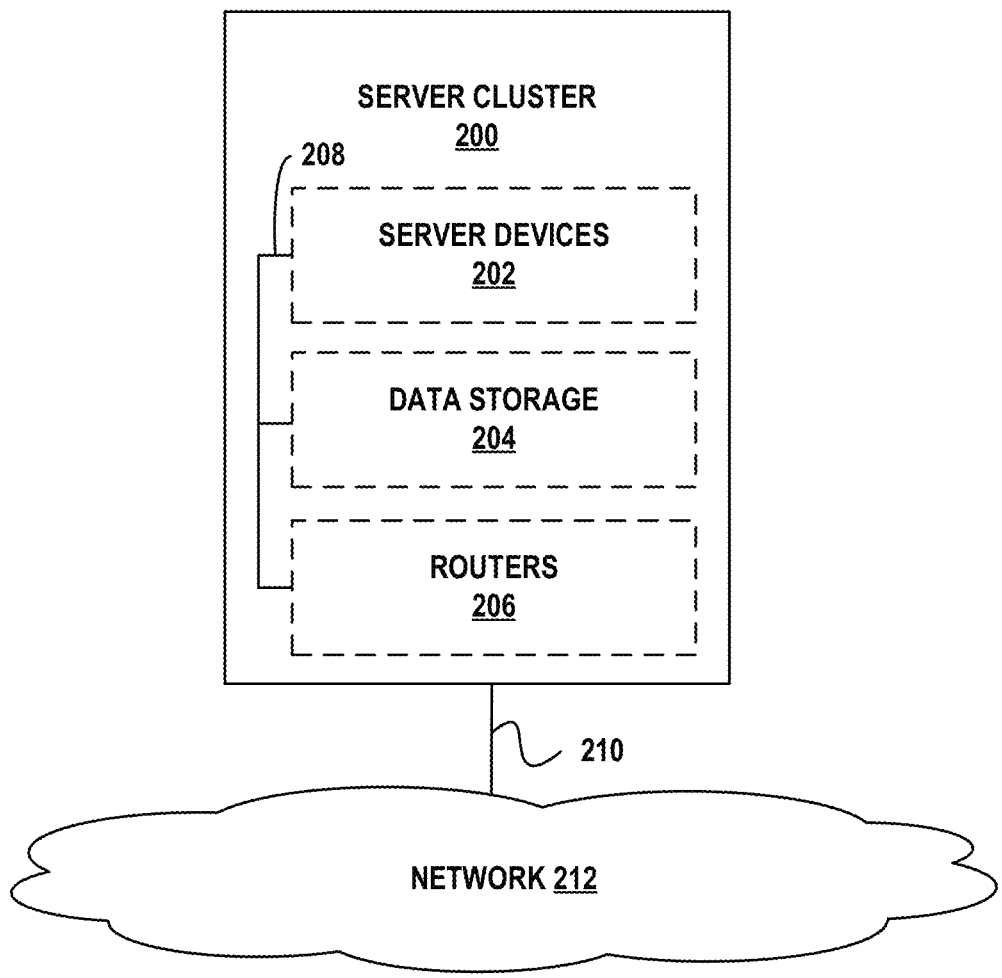
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
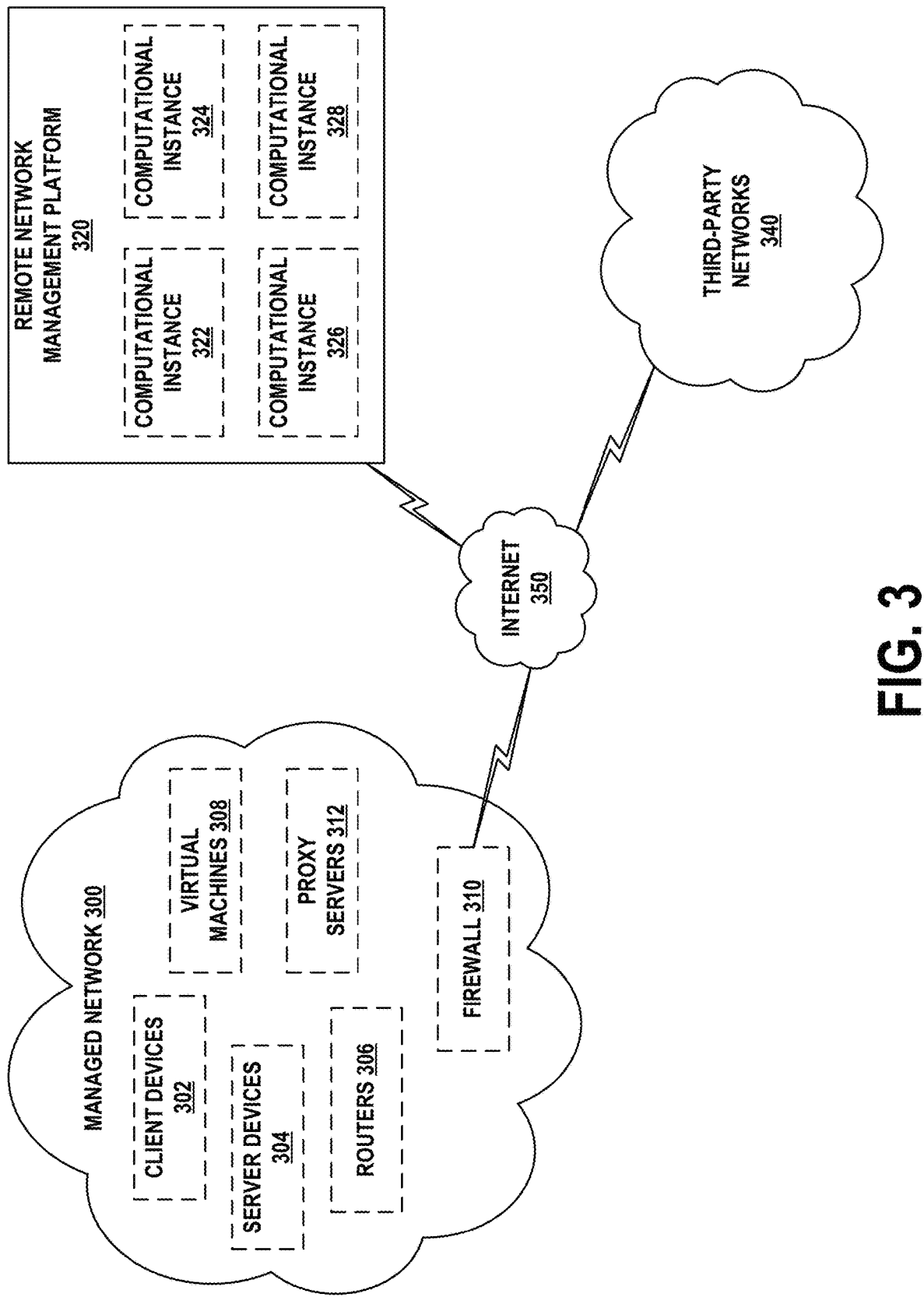
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
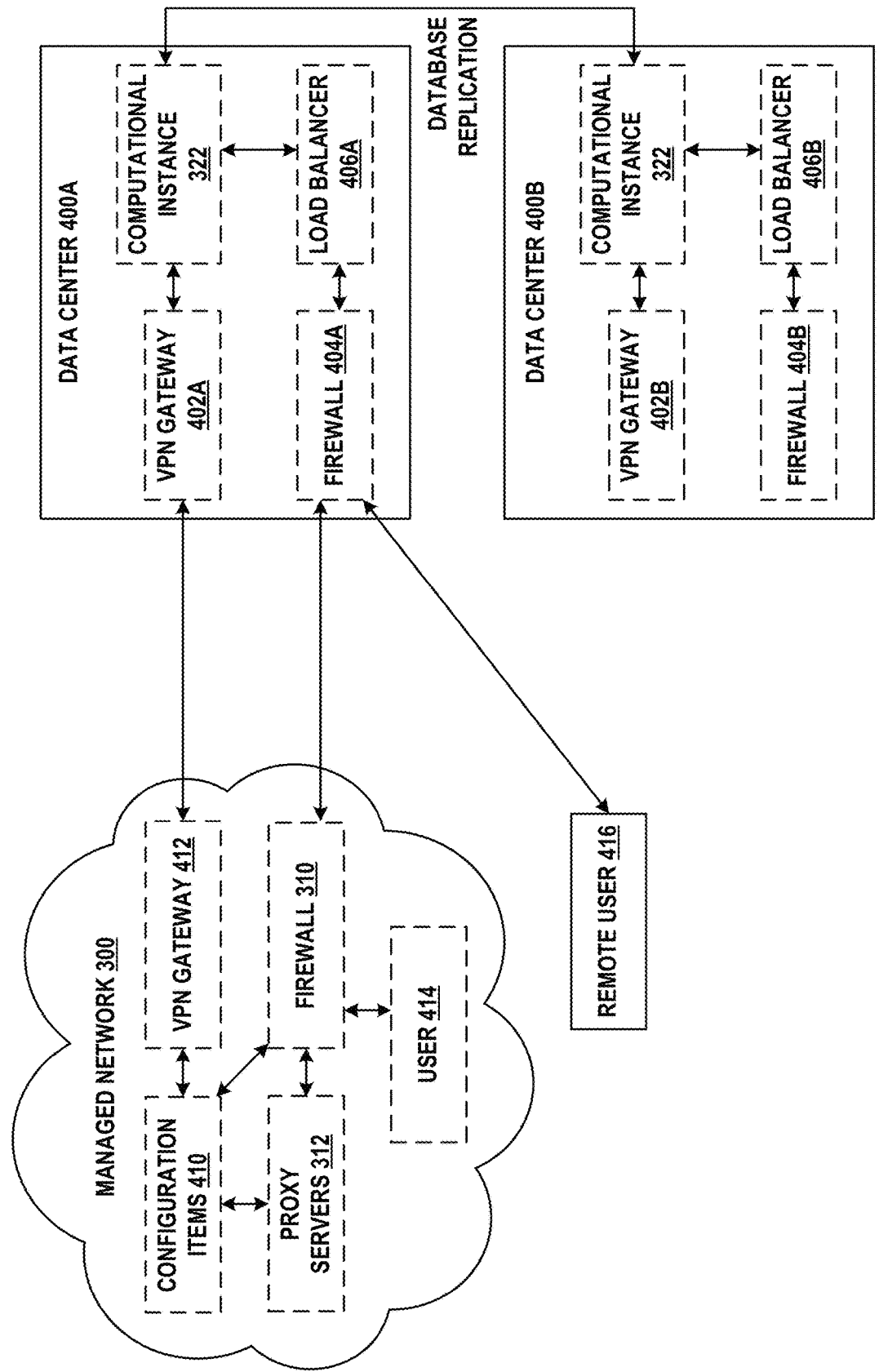
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
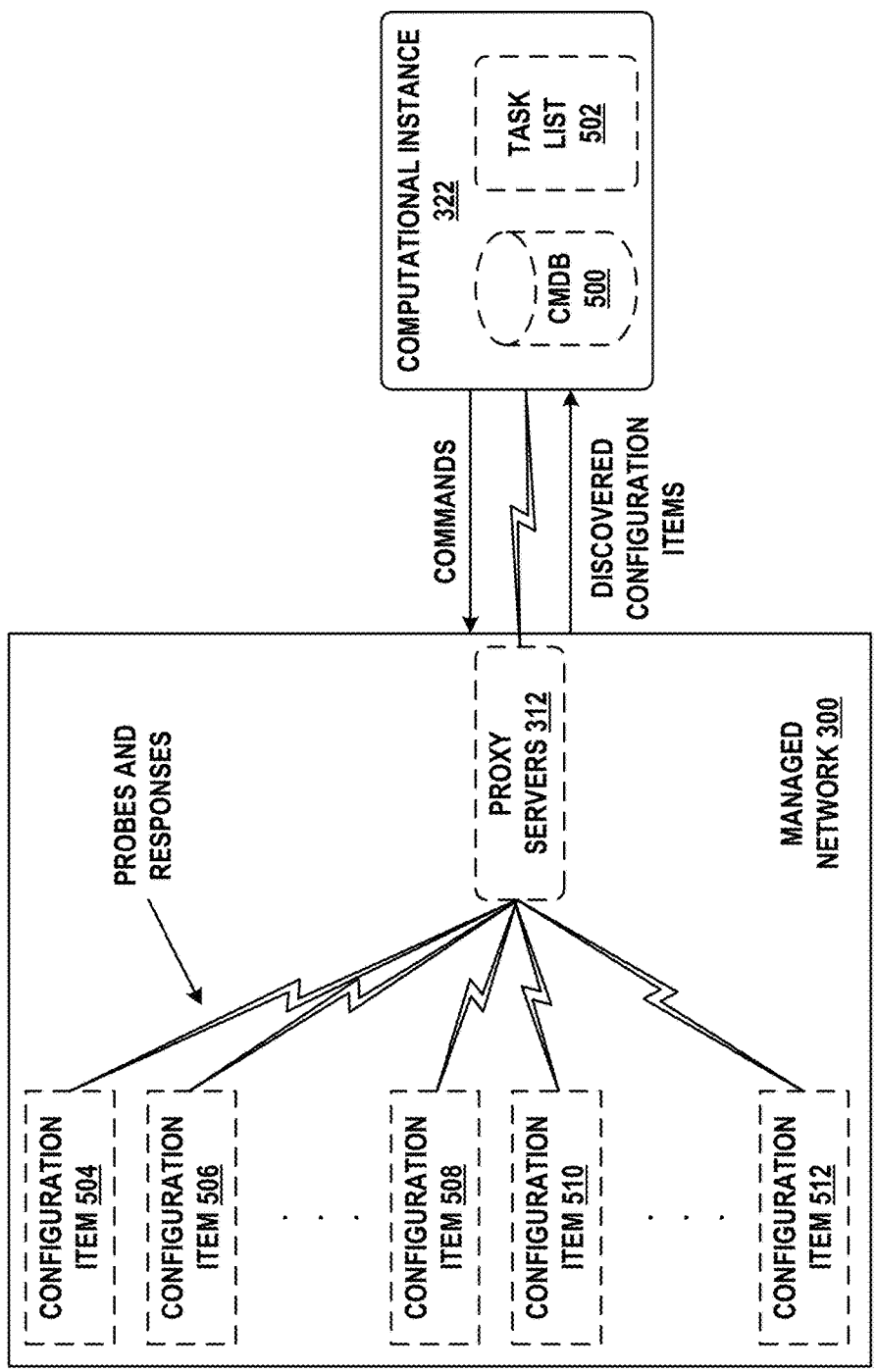
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
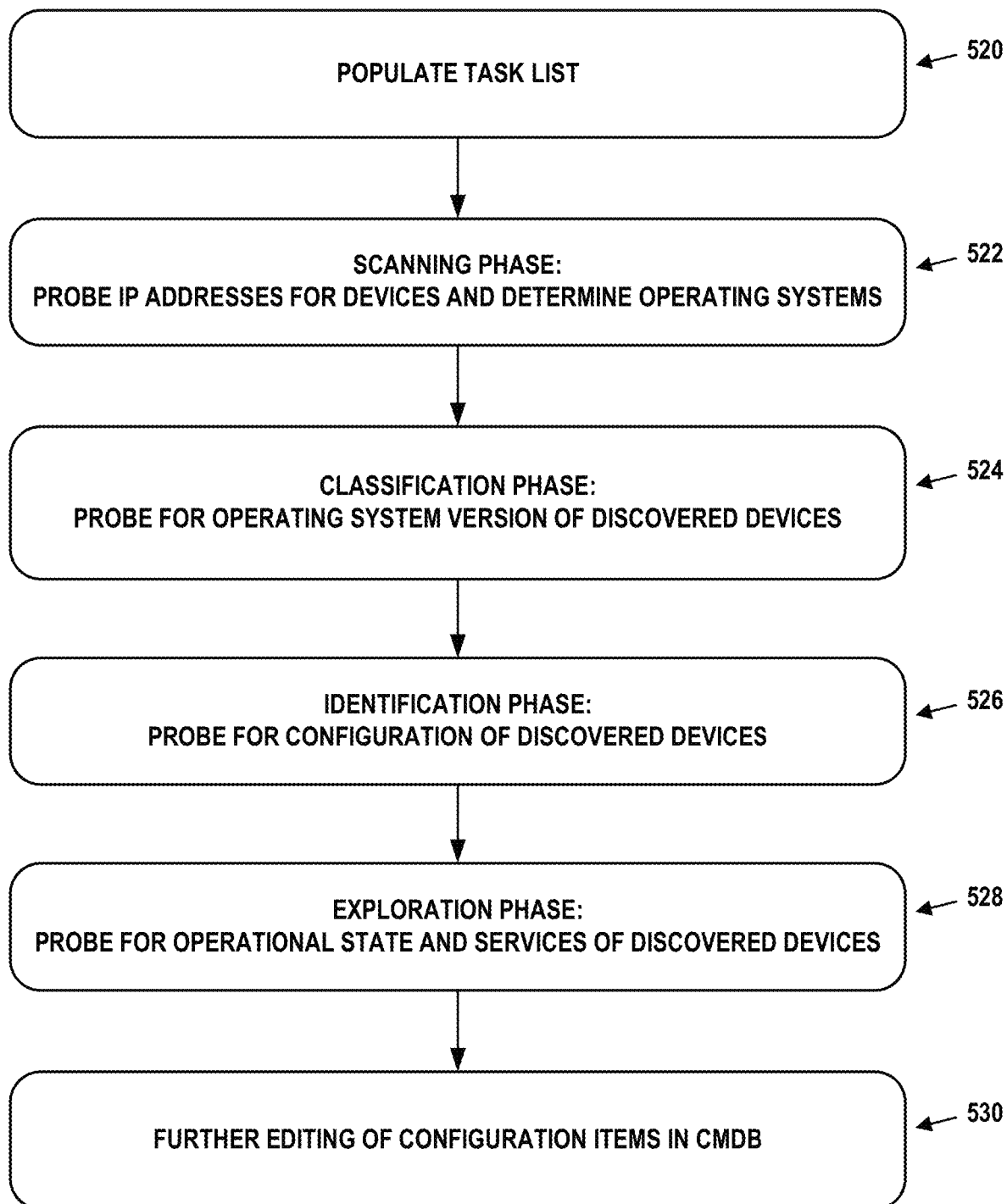
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Incident and Problem Records

In practice, users may encounter various issues when using devices, applications, and/or services associated with the managed network 300. By way of example, a user may encounter a computer crashing, internet connectivity issues, printing issues, error messages, phishing attempts, and/or slow performance of a service. In yet other examples, a user may be unable to log on to a service and/or may request new equipment or software, and so on.

Given this, the remote network management platform 320 may provide a service that allows user(s) to report issues with configuration items of the managed network 300, and that allows agent(s) to track and/or manage such issues. For example, a user could report an issue by using a client device 302 to submit a trouble ticket or help request via a desktop or web-based application associated with the remote network management platform 320. And an agent (e.g., member of an enterprise's IT team) tasked with resolving the reported issue could view information about this issue, also via an application on a client device 302, for example.

More specifically, when a user of managed network 300 reports an issue, a corresponding record may be generated and stored at a database device of the remote network management platform 320. Such a record may be referred to herein as an "incident record" and may include information related to the reported issue.

An incident record can be generated in various ways. For instance, the remote network management platform 320 can be configured to automatically generate the incident record upon receipt of certain information from the user related to the issue (e.g., receipt of a trouble ticket or help request). Additionally or alternatively, an agent or other authorized administrator may generate the incident record via an application or the like, such as according to information about the reported issue as received from the user. Further, upon generation of the incident record, the incident record may be manually or automatically assigned to an agent, so that the agent is effectively tasked with resolving the reported issue specified in the incident record. Through an application or the like, the agent may access and review the incident record, and may begin providing assistance to the user in an attempt to resolve the issue.

Further, an incident record can take the form of a set of data that represents a variety of information, or "components," associated with a reported issue. Such components can include, for example: (i) an identifier of a user reporting the issue (e.g., the user's name, or a unique string of characters associated with the user), (ii) a status of the incident record (e.g., open, unassigned, in progress, closed), (iii) a description of the issue (e.g., a manually, semi-autonomously, or fully-autonomously generated textual summary of the problem the user has encountered), (iv) a date/time when the incident record is created, (v) dates/times when the status of the issue or any other information of the incident record is changed, (vi) a current owner of the incident record (e.g., the agent or group of agents assigned to resolve the issue), (vii) a priority level for the incident record (e.g., low, medium, or high), (viii) information indicating any efforts that have been made towards resolving the issue (e.g., dates/times such efforts were started and/or completed, and a description of such efforts), (ix) an incident number, (x) a date/time by which resolution of the issue is due or requested by the user to be completed, and/or other information. This information may be textual, and/or may include images, sounds, videos, etc.

In addition, the remote network management platform 320 may generate, store, and/or provide access to "problem records". A problem record may describe or otherwise relate to an issue commonly specified in a number of incident records. On this point, the database device of the remote network management platform 320 may contain link(s) between a given problem record and incident record(s) to which the given problem record is related according to the common issue. As such, a given problem record could assist with management of an issue commonly reported in several incident records.

A problem record can be generated in various ways. For instance, the remote network management platform 320 can be configured to autonomously generate the problem record upon a determination that a threshold number of incident records specify the same issue. Additionally or alternatively, an agent or other authorized administrator may generate the problem record via an application or the like, such as according to information in several related incident records. During this process, the remote network management platform 320 may store link(s) between the problem record and the related incident record(s). Further, through an application or the like, an agent may access and review the problem record, which may assist the agent with evaluation of a root cause of the issue reported in several incident records and/or with more efficient resolution of this issue when it is encountered by many devices, among other advantages.

Further, a problem record can take the form of a set of data that represents information including, for example: (i) identifier(s) of user(s) reporting the issue specified in the related incident records, (ii) a status of the problem record, (iii) a description of the issue, (iv) a date/time when the problem record is created, (v) dates/times when the status of the issue or any other information of the problem record is changed, (vi) a current owner of the problem record (e.g., the agent or group of agents assigned to resolve the issue), (vii) a priority level for the problem record, (viii) information indicating any efforts that have been made towards resolving the issue, (ix) identifier(s) of incident record(s) related to the problem record, (x) a date/time by which resolution of the issue is due or requested to be completed, and/or other information. Here again, the information may be textual, and/or may include images, sounds, videos, etc.

In an example scenario, numerous incident records might each respectively indicate that individual(s) at an enterprise are unable to access email services after WiFi routers at the enterprise have been updated. And agent(s) may generate a problem record indicating that individuals at the enterprise are unable to access email services following the update of the WiFi routers at the enterprise. Then, the agent(s) may link these incident records to the generated problem record, so that, once a solution for restoring access to email services has been determined, agent(s) could leverage the problem record to easily identify all related incident records for which that solution should be applied. Other example scenarios are also possible.

VII. Record Lifecycle Improvement

Although a remote network management platform may provide service(s) that enable use of a problem record to assist with tracking, management, and/or handling of issues associated with a managed network, the problem record might not be arranged in line with workflow(s) that agent(s) often use to resolve issues. In practice, this could lead to various challenges.

In particular, the problem record could be programmatically assigned to and/or transition between various states each respectively representative of an event related to resolution of an issue described in the problem record. But such states may not sufficiently represent the various events and/or the sequence of events that may occur in an enterprise during resolution of the issue.

By way of example, agent(s) may carry out a root cause analysis with respect to an issue specified in many incident records, so as to identify the underlying cause of the issue and thus attempt to permanently resolve the issue. Yet, a problem record for this issue might not be arranged for assignment and/or transition to a state corresponding to such root cause analysis. Rather, the problem record may only be arranged for assignment to an "open" state indicating that the issue has not yet been resolved, or to a "closed" state indicating that the issue is resolved. Given this, agent(s) reviewing the problem record may not be aware that the issue is undergoing root cause analysis, and may inadvertently apply an insufficient resolution to the issue or may even begin resolution of the issue before the root cause analysis is complete, among other possible disadvantages. Other examples are also possible.

Disclosed herein is an improved GUI for a problem record, which conforms to workflow(s) that are often used within enterprises in various industries.

Figure 6:
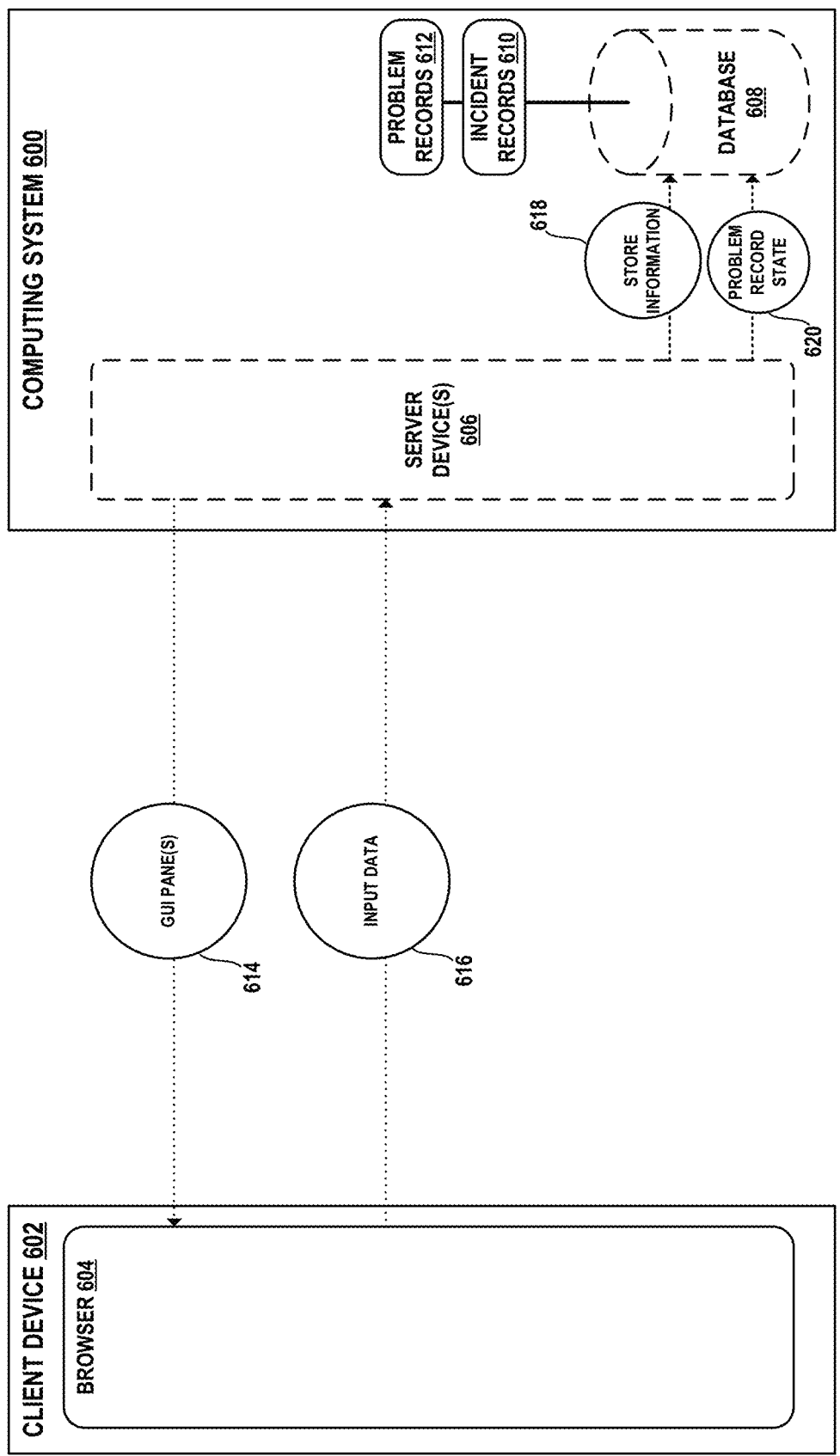
FIG. 6 depicts communications between a computing system and a client device, in accordance with example embodiments.

FIG. 6 illustrates features, components, and/or operations of a computing system 600 and of a managed network's client device 602. Although FIG. 6 illustrates a specific arrangement, operations disclosed herein may be carried out in the context of similar and/or other arrangement(s) as well without departing from the scope of the present disclosure.

Specifically, client device 602 may be one of the client devices 302 on the managed network 300, for example. Generally, the client device 602 may engage in communication with computing system 600, such as via wired and/or wireless communication link(s) (not shown). Moreover, as shown, the client device 602 may be configured to operate a web browser 604, which is an application that may retrieve, present, and/or navigate through information on the World Wide Web and/or on private websites.

The browser 604 may include a web-display tool (not shown) that provides for or otherwise supports display of information, such as information received from computing system 600. For example, the web-display tool may display the disclosed GUI that may help agent(s) streamline resolution of reported issues.

Further, computing system 600 may include server device(s) 606. The server device(s) 606 may contain or may otherwise have access to program instructions executable by processor(s), so as to cause the computing system 600 to carry out various operations described herein. On this point, the server device(s) 606 may include server device(s) disposed within a computational instance of a remote network management platform, such as computational instance 322 of remote network management platform 320, and/or may include server device(s) disposed within a managed network. Thus, the various operations described herein could be carried out by just one server device and/or could be distributed among two or more of server devices in any feasible manner. As such, the computing system 600 could include features and/or components of a managed network and/or of a remote network management platform that supports remote management of the managed network.

Also, the computing system 600 may include a database 608. This database 608 could be a CMDB of a computational instance, such as CMDB 500 for example. Additionally or alternatively, database 608 may be a database that is different from a CMDB.

As shown, the database 608 contains incident records 610 and problem records 612, which could be arranged as described herein. In line with the discussion above, incident records 610 may include information about reported issues with configuration items related to the managed network 300. And each problem record 612 may describe an issue related to a number of incident records 610 that commonly specify an issue.

Given this arrangement, the computing system 600 may be configured to provide, for display by the client device 602, various GUI panes 614 of the disclosed GUI, each GUI pane corresponding to one of the states of a particular problem record, in accordance with the present disclosure. When a given one of the GUI panes 614 is displayed, the computing system 600 may receive input data 616 from the client device 602, such as when an individual uses the client device 602 to activate a control on the given GUI pane and/or enters information (e.g., notes) via the given pane, among other options. As such, the computing system 600 may store, in the database 608, information 618 with respect to the particular problem record, as may be specified by the input data 616. Additionally or alternatively, the computing system 600 may store, in the database 608, an indication of a state change 620 that has occurred for the particular problem record according to activation of a particular control, as may be specified by the input data 616.

Figure 7:
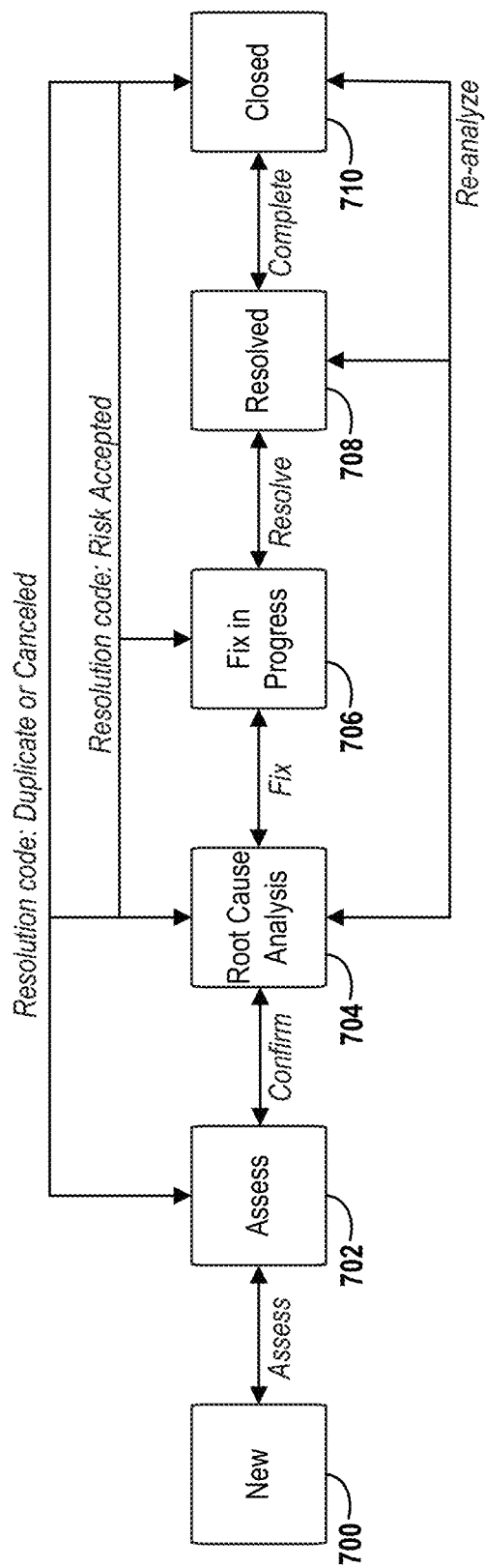
FIG. 7 depicts a plurality of states of a record, in accordance with example embodiments.

FIG. 7 next illustrates various states for a problem record, in accordance with the present disclosure. In particular, the problem record may be assigned to and/or transition to a state 700 for newly-opened records, which indicates an initial stage of managing the problem record. Additionally, the problem record may be assigned to and/or transition to a state 702 for records undergoing assessment, and such assessment may involve categorizing the problem record, confirming whether the issue described in the problem record is indeed an issue that needs to be resolved, and/or determining whether the problem record should be closed (e.g., due to being a duplicate or for other reasons). Further, the problem record may be assigned to and/or transition to a state 704 for records undergoing root cause analysis, such as when agent(s) attempt to identify the underlying cause of the issue in order to permanently and sufficiently resolve the issue. Yet further, the problem record may be assigned to and/or transition to a state 706 for records with a fix in progress, such as when agent(s) are in-progress of applying a resolution for the issue (e.g., one or more fixes identified during root cause analysis). Yet further, the problem record may be assigned to and/or transition to a state 708 for resolved records, which may indicate that one or more fixes we applied to resolve the issue. Yet further, the problem record may be assigned to and/or transition to a state 710 for closed records, which may indicate an end to management of the problem record, such as due to the problem record being a duplicate, due to the issue being resolved, and/or due to acceptance of the risk posed by the issue, among other possible reasons.

Moreover, FIG. 7 illustrates transitions between the states, in accordance with the present disclosure. For example, the problem record could transition from the state 700 for newly-opened records to the state 702 for recording undergoing assessment. In another example, the problem record could transition from the state 702 for records undergoing assessment to the state 704 for records undergoing root cause analysis. Additionally or alternatively, the problem record could transition from the state 702 for records undergoing assessment to the state 710 for closed records. Such a transition may be accompanied with storing, in the database 608, of a resolution code indicating that the problem record is a duplicate of another record and/or that the problem record is cancelled. In yet another example, the problem record could transition from the state 704 for records undergoing root cause analysis to the state 706 for records with a fix in progress. Additionally or alternatively, the problem record could transition from the state 704 for records undergoing root cause analysis to the state 710 for closed records. Such a transition may be accompanied with storing, in the database 608, of a resolution code indicating that the problem record is a duplicate of another record, that the problem record is cancelled, and/or acceptance of a risk posed by issue associated with the problem record. In yet another example, the problem record could transition from the state 706 for records with a fix in progress to the state 708 for resolved records. Additionally or alternatively, the problem record could transition from the state 706 for records with a fix in progress to the state 710 for closed records. Such a transition may be accompanied with storing, in the database 608, of a resolution code indicating acceptance of a risk posed by issue associated with the problem record. In yet another example, the problem record could transition from the state 708 for resolved records to the state 710 for closed records. In yet another example, the problem record could transition from the state 708 for resolved records back to the state 704 for records undergoing root cause analysis. In yet another example, the problem record could transition from the state 710 for closed records back to the state 704 for records undergoing root cause analysis and/or back to the state 708 for resolved records. Note that not all transitions in FIG. 7 are explicitly described, and that other examples are also possible.

FIGS. 8-12 and 13A-13D next provide an illustrative example of the disclosed GUI panes that correspond to the various states shown in FIG. 7. Nonetheless, the embodiments herein can operate with a wide variety of user interface layouts and designs, and should not be viewed as limited to this example.

Figure 8:
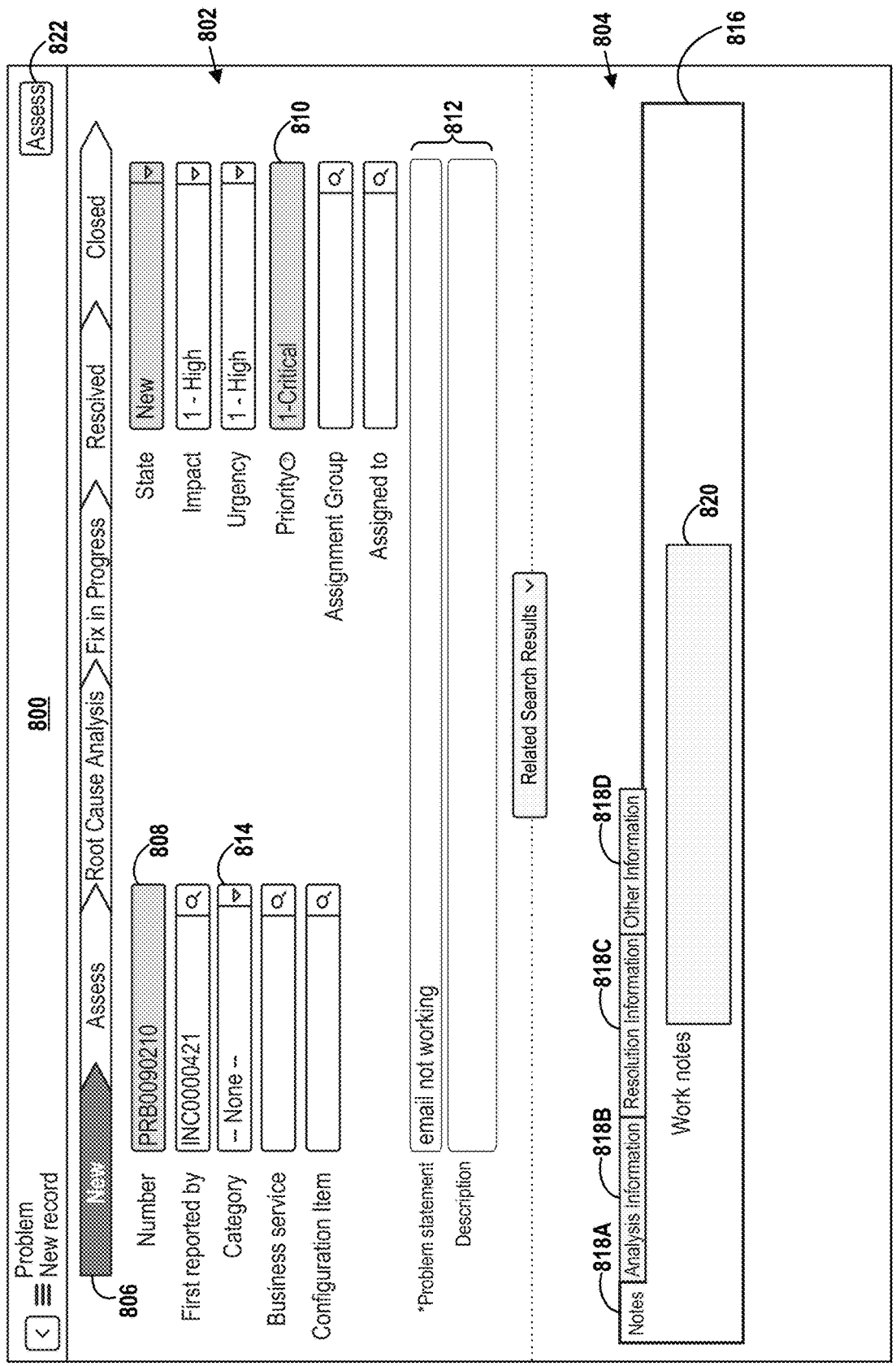
FIG. 8 depicts a graphical user interface pane corresponding to a newly-opened record, in accordance with example embodiments.

FIG. 8 shows a GUI pane 800 that corresponds to the state 700 for newly-opened records, and that has a section 802, a section 804, and a graphic 806, among other features.

Section 802 includes fields that display and/or enable entry of information for a problem record. For example, the section 802 includes a field 808 showing a unique identifier of the problem record (e.g., "PRB0090210"), which may be automatically assigned and/or manually entered. In another example, the section 802 includes a field 810 showing a priority of the problem record (e.g., "1-Critical"), which may be manually entered and/or may be based on a priority of incident record(s) associated with the problem record, among other possibilities. In yet another example, the section 802 includes a field 814 showing a category of the problem record, which may be manually selected from a menu and/or may be based on a category of incident record(s) associated with the problem record, among other possibilities. In yet another example, the section 802 include fields 812 that show a description of the issue represented by the particular record, which may be manually entered and/or copied from incident record(s) associated with the problem record, among other possibilities. Other examples are also shown.

Additionally, section 804 includes an interface feature 816 including various tabs 818A-818D enabling review and/or entry of notes and/or other information relevant to a given state of the problem record, among others. As shown, section 804 in GUI pane 800 includes a dialog box 820 that enables entry of work notes via tab 818A. Such work notes may be any preliminary notes entered by agent during this initial stage of problem record management, such as notes related to tracking of the problem record, among other options.

Further, the graphic 806 identifies the various states shown in FIG. 7, and visually points out the state corresponding to GUI pane 800. In particular, the graphic 806 includes a list of state identifiers representative of the various states, and those state identifiers are ordered within the list according to the sequence of the states shown in FIG. 7, which demonstrates the workflow enabled by those states. For example, the graphic 806 shows a "New" identifier, followed by an "Assess" identifier, followed by a "Root Cause Analysis" identifier, followed by a "Fix in Progress" identifier, following by a "Resolved" identifier, followed by a "Closed" identifier. Moreover, the graphic 806 includes a visual depiction indicating the state to which the problem record is assigned. For example, the "New" identifier of the graphic 806 is highlighted to indicate that the problem record is assigned to the state 700 for newly-opened records.

In a further aspect, the GUI pane 800 also includes an "Assess" control 822 configured to cause the problem record to be assigned to the state 702 for records undergoing assessment. In particular, when the control 822 is activated, the problem record may transition from the state 700 for newly-opened records to the state 702 for records undergoing assessment, as described with respect to FIG. 7. Additionally, when the control 822 is activated, the computing system 600 may provide, to the client device 602 for display, a GUI pane corresponding to the state 702 for records undergoing assessment.

Figure 9:
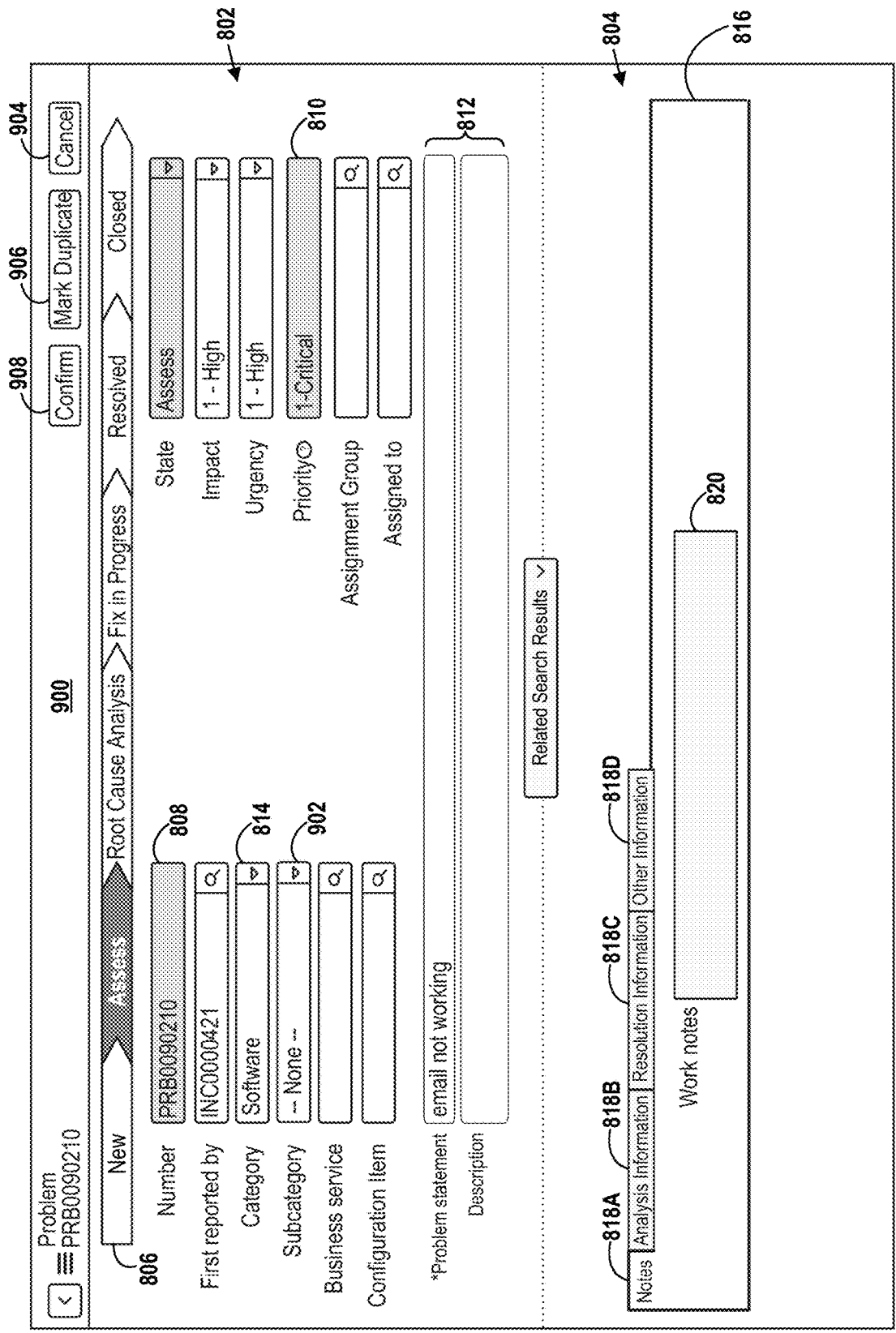
FIG. 9 depicts a graphical user interface pane corresponding to a record undergoing assessment, in accordance with example embodiments.

Accordingly, FIG. 9 shows a GUI pane 900 that corresponds to the state 702 for records undergoing assessment, and that also has the section 802, the section 804, and the graphic 806, among other features. As shown, section 804 in GUI pane 900 includes the same or similar GUI features that this section 804 also has in GUI pane 800.

On the other hand, section 802 in GUI pane 900 includes the same fields that this section 802 also has in GUI pane 800, as well as other fields. In particular, section 802 in GUI pane 900 includes fields 808, 810, 812, and 814 described above. Additionally, section 802 in GUI pane 900 includes a field 902 enabling selection of a subcategory from a list of subcategories, such as from a drop-down menu, for example. In practice, the computing system 600 may cause GUI pane 900 to display this field 902 in response to selection of a category in field 814, which could be carried out via GUI pane 800 and/or via GUI pane 900. Further, the list of subcategories may be based on the actual category that is selected in field 814. For example, if a "Software" category is selected in field 814, then a list of software-related features (e.g., "Email", "Web Browser", "Antivirus" etc.) may be displayed in a drop-down menu via field 902. Whereas, if a "Hardware" category is selected in field 814, then a list of hardware-related features (e.g., "Motherboard", "Graphics Processing Unit (GPU)", "Keyboard" etc.) may be displayed in a drop-down menu via field 902. Other examples are also possible.

Further, the graphic 806 in GUI pane 900 still identifies the various states shown in FIG. 7, but has updated to visually point out the state corresponding to GUI pane 900. In particular, the graphic 806 includes an updated visual depiction indicating the state to which the problem record is assigned. For example, the "Assess" identifier of the graphic 806 is highlighted to indicate that the problem record is assigned to the state 702 for records undergoing assessment. Other examples are also possible.

In a further aspect, the GUI pane 900 also includes a "Cancel" control 904, a "Mark Duplicate" control 906, and a "Confirm" control 908.

The "Cancel" control 904 may be configured to cause the problem record to be assigned to state 710 for closed records. In particular, when the control 904 is activated, the problem record may transition from the state 702 for records undergoing assessment to the state 710 for closed records, as described with respect to FIG. 7. Additionally, when the control 904 is activated, the computing system 600 may provide, to the client device 602 for display, a GUI pane corresponding to the state 710 for closed records. Further, when the control 904 is activated, the computing system 600 may store, in the database 608, a resolution code indicating that the problem record is cancelled, and computing system 600 may cause display of this resolution code in the GUI pane corresponding to the state 710 for closed records, so that an agent reviewing the closed problem record is informed about the reason for closing of the record.

The "Mark Duplicate" control 906 may also be configured to cause the problem record to be assigned to state 710 for closed records. In particular, when the control 906 is activated, the problem record may transition from the state 702 for records undergoing assessment to the state 710 for closed records, as described with respect to FIG. 7. Additionally, when the control 906 is activated, the computing system 600 may provide, to the client device 602 for display, a GUI pane corresponding to the state 710 for closed records. Further, when the control 906 is activated, the computing system 600 may store, in the database 608, a resolution code indicating that the problem record is a duplicate of another record, and computing system 600 may cause display of this resolution code in the GUI pane corresponding to the state 710 for closed records, so that an agent reviewing the closed problem record is informed about the reason for closing of the record.

The "Confirm" control 908 may be configured to cause the problem record to be assigned to the state 704 for records undergoing root cause analysis. In particular, when the control 908 is activated, the problem record may transition from the state 702 for records undergoing assessment to the state 704 for records undergoing root cause analysis, as described with respect to FIG. 7. Additionally, when the control 908 is activated, the computing system 600 may provide, to the client device 602 for display, a GUI pane corresponding to the state 704 for records undergoing root cause analysis.

Figure 10:
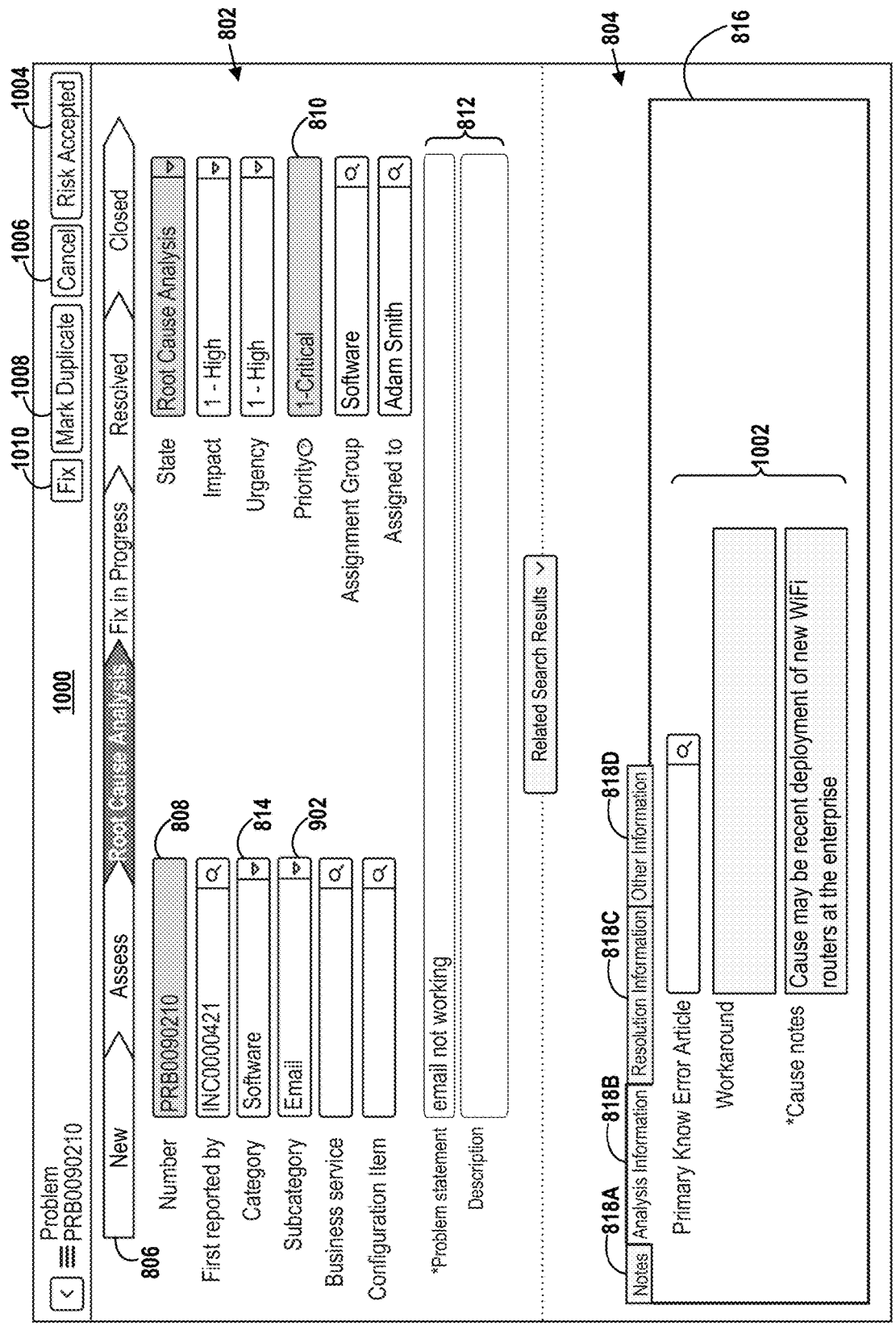
FIG. 10 depicts a graphical user interface pane corresponding to a record undergoing root cause analysis, in accordance with example embodiments.

Accordingly, FIG. 10 shows a GUI pane 1000 that corresponds to the state 704 for records undergoing root cause analysis, and that also has the section 802, the section 804, and the graphic 806, among other features. As shown, section 802 in GUI pane 1000 includes the same or similar GUI features that this section 802 also has in GUI pane 900.

On the other hand, section 804 in GUI pane 1000 shows interface feature 1002 within tab 818B. In one case, the interface feature 1002 within tab 818B may be displayed automatically when GUI pane 1000 is displayed. In another case, the interface feature 1002 within tab 818B may be displayed in response to selection of the tab 818B via GUI pane 1000. In any case, interface feature 1002 enables review and/or entry of notes and/or other information relevant to root cause analysis, such as a summary of the root cause analysis of the issue.

In particular, the interface feature 1002 includes a field to enable searching for knowledge base articles, which may be stored in the database 608 and may include information related to resolution of at least some issues (e.g., describe a procedure to resolve an issue). On this point, this field within interface feature 1002 may also enable generating an association, in the database 608, between a relevant knowledge base article and the problem record, so that agent(s) working to resolve the issue can conveniently refer to this knowledge base article via the problem record. Additionally, the interface feature 1002 includes a dialog box for entering notes about a workaround for the issue described in the problem record, which may relate to action(s) that agent(s) can carry to at least temporarily resolve the issue. Further, the interface feature 1002 includes a dialog box for entering notes about a root cause of the issue, which may identify the underlying cause of the issue. For example, this dialog box in FIG. 10 states that the cause of "email not working" (i.e., as described in field 812) may be " . . . recent deployment of new WiFi router at the enterprise . . . " Other examples are also possible.

Further, the graphic 806 in GUI pane 1000 still identifies the various states shown in FIG. 7, but has updated to visually point out the state corresponding to GUI pane 1000. In particular, the graphic 806 includes an updated visual depiction indicating the state to which the problem record is assigned. For example, the "Root Cause Analysis" identifier of the graphic 806 is highlighted to indicate that the problem record is assigned to the state 704 for records undergoing root cause analysis. Other examples are also possible.

In a further aspect, the GUI pane 1000 also includes a "Risk Accepted" control 1004, a "Cancel" control 1006, a "Mark Duplicate" control 1008, and a "Fix" control 1010.

The "Risk Accepted" control 1004 may be configured to cause the problem record to be assigned to state 710 for closed records. In particular, when the control 1004 is activated, the problem record may transition from the state 704 for records undergoing root cause analysis to the state 710 for closed records, as described with respect to FIG. 7. Additionally, when the control 1004 is activated, the computing system 600 may provide, to the client device 602 for display, a GUI pane corresponding to the state 710 for closed records. Further, when the control 1004 is activated, the computing system 600 may store, in the database 608, a resolution code indicating acceptance of a risk posed by issue associated with the problem record, and computing system 600 may cause display of this resolution code in the GUI pane corresponding to the state 710 for closed records, so that an agent reviewing the closed problem record is informed about the reason for closing of the record.

The "Cancel" control 1006 may also be configured to cause the problem record to be assigned to state 710 for closed records. In particular, when the control 1006 is activated, the problem record may transition from the state 704 for records undergoing root cause analysis to the state 710 for closed records, as described with respect to FIG. 7. Additionally, when the control 1006 is activated, the computing system 600 may provide, to the client device 602 for display, a GUI pane corresponding to the state 710 for closed records. Further, when the control 1006 is activated, the computing system 600 may store, in the database 608, a resolution code indicating that the problem record is cancelled, and computing system 600 may cause display of this resolution code in the GUI pane corresponding to the state 710 for closed records, so that an agent reviewing the closed problem record is informed about the reason for closing of the record.

The "Mark Duplicate" control 1008 may also be configured to cause the problem record to be assigned to state 710 for closed records. In particular, when the control 1008 is activated, the problem record may transition from the state 704 for records undergoing root cause analysis to the state 710 for closed records, as described with respect to FIG. 7. Additionally, when the control 1008 is activated, the computing system 600 may provide, to the client device 602 for display, a GUI pane corresponding to the state 710 for closed records. Further, when the control 1008 is activated, the computing system 600 may store, in the database 608, a resolution code indicating that the problem record is a duplicate of another record, and computing system 600 may cause display of this resolution code in the GUI pane corresponding to the state 710 for closed records, so that an agent reviewing the closed problem record is informed about the reason for closing of the record.

The "Fix" control 1010 may be configured to cause the problem record to be assigned to the state 706 for records with a fix in progress. In particular, when the control 1010 is activated, the problem record may transition from the state 704 for records undergoing root cause analysis to the state 706 for records with a fix in progress, as described with respect to FIG. 7. Additionally, when the control 1010 is activated, the computing system 600 may provide, to the client device 602 for display, a GUI pane corresponding to the state 706 for records with a fix in progress.

Figure 11:
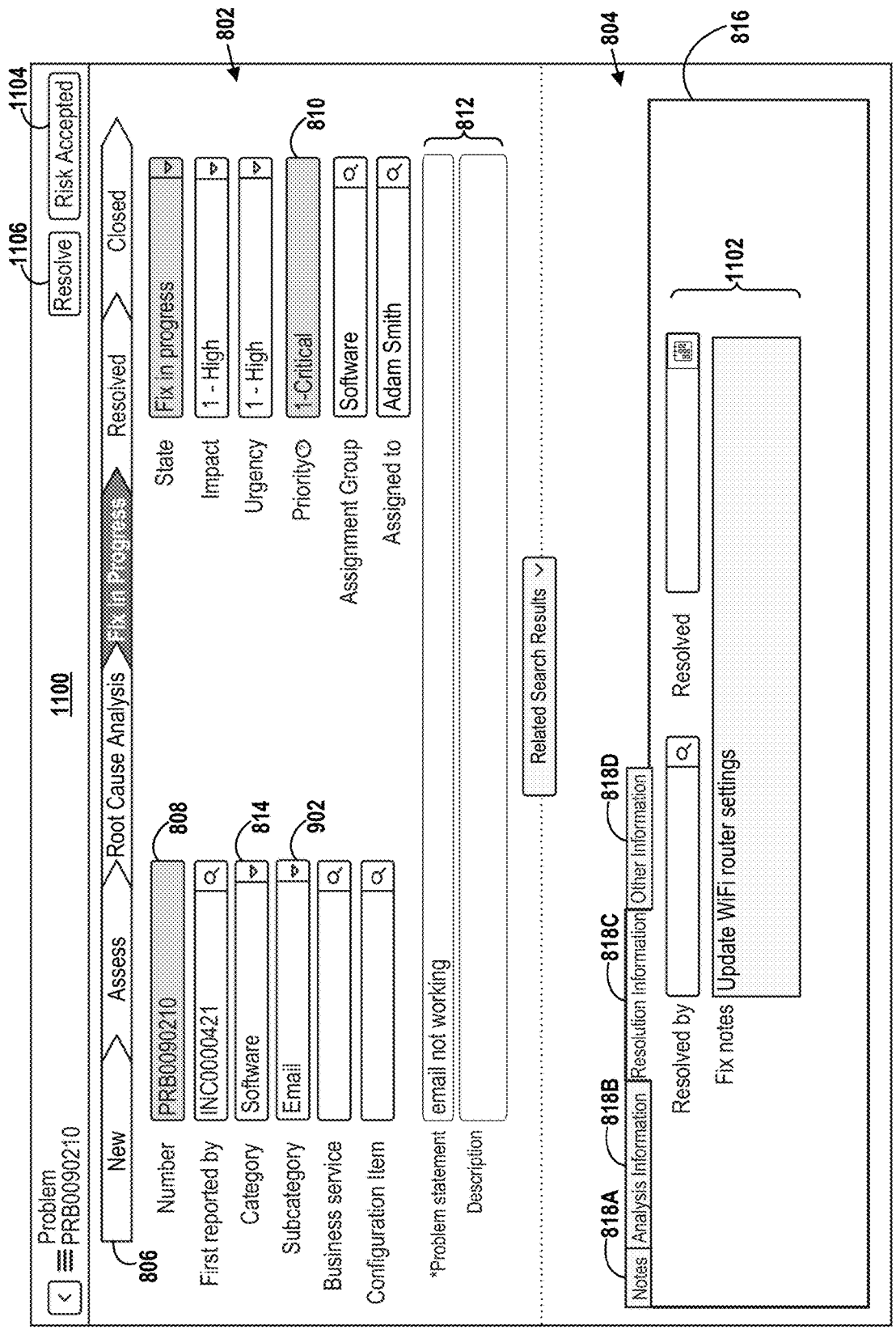
FIG. 11 depicts a graphical user interface pane corresponding to a record with a fix in progress, in accordance with example embodiments.

Accordingly, FIG. 11 shows a GUI pane 1100 that corresponds to the state 706 for records with a fix in progress, and that also has the section 802, the section 804, and the graphic 806, among other features. As shown, section 802 in GUI pane 900 includes the same or similar GUI features that this section 802 also has in GUI panes 900 and 1000.

On the other hand, section 804 in GUI pane 1100 shows interface feature 1102 within tab 818C. In one case, the interface feature 1102 within tab 818C may be displayed automatically when GUI pane 1100 is displayed. In another case, the interface feature 1102 within tab 818C may be displayed in response to selection of the tab 818C via GUI pane 1100. In any case, interface feature 1102 enables review and/or entry of notes and/or other information relevant to the issue being fixed, such as a summary of a solution applied to the issue.

In particular, the interface feature 1102 includes a field for specifying an agent that applied or is applying a solution to the issue, such as by enabling search and/or entry of a unique identifier of a user-account established for that agent, for example. Additionally, the interface feature 1102 includes a field for specifying a time that the solution is applied (e.g., date that the solution is applied and/or number of days that have passed since the solution has been applied). Further, the interface feature 1102 includes a dialog box for entering notes about the solution, such as a description of the solution. For example, this dialog box in FIG. 11 states that the solution to "email not working" (i.e., as described in field 812) may be to "Update WiFi router setting". Other examples are also possible.

Further, the graphic 806 in GUI pane 1100 still identifies the various states shown in FIG. 7, but has updated to visually point out the state corresponding to GUI pane 1100. In particular, the graphic 806 includes an updated visual depiction indicating the state to which the problem record is assigned. For example, the "Fix in Progress" identifier of the graphic 806 is highlighted to indicate that the problem record is assigned to the state 706 for records with a fix in progress. Other examples are also possible.

In a further aspect, the GUI pane 1100 also includes a "Risk Accepted" control 1104 and a "Resolve" control 1106.

The "Risk Accepted" control 1104 may be configured to cause the problem record to be assigned to state 710 for closed records. In particular, when the control 1104 is activated, the problem record may transition from the state 706 for records with a fix in progress to the state 710 for closed records, as described with respect to FIG. 7. Additionally, when the control 1104 is activated, the computing system 600 may provide, to the client device 602 for display, a GUI pane corresponding to the state 710 for closed records. Further, when the control 1104 is activated, the computing system 600 may store, in the database 608, a resolution code indicating acceptance of a risk posed by the issue associated with the problem record, and computing system 600 may cause display of this resolution code in the GUI pane corresponding to the state 710 for closed records, so that an agent reviewing the closed problem record is informed about the reason for closing of the record.

The "Resolve" control 1106 may be configured to cause the problem record to be assigned to state 708 for resolved records. In particular, when the control 1106 is activated, the problem record may transition from the state 706 for records with a fix in progress to the state 708 for resolved records, as described with respect to FIG. 7. Additionally, when the control 1106 is activated, the computing system 600 may provide, to the client device 602 for display, a GUI pane corresponding to the state 708 for resolved records.

Figure 12:
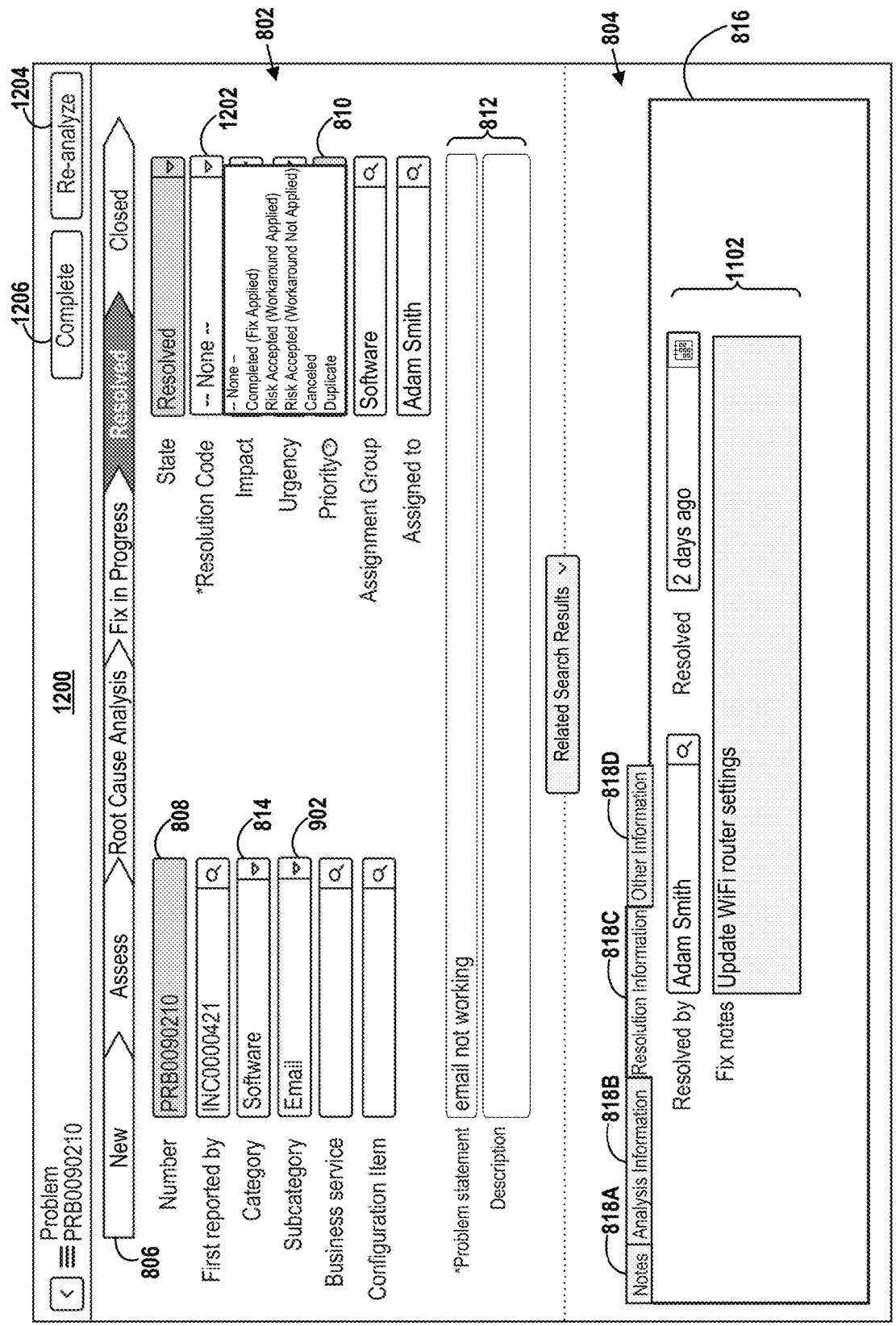
FIG. 12 depicts a graphical user interface pane corresponding to a resolved record, in accordance with example embodiments.

Accordingly, FIG. 12 shows a GUI pane 1200 that corresponds to the state 708 for resolved records, and that also has the section 802, the section 804, and the graphic 806, among other features. As shown, section 804 in GUI pane 1200 includes the same or similar GUI features that this section 804 also has in GUI panes 1100. However, the section 804 in GUI pane 1200 also displays, within interface feature 1102, the name of the agent who applied the solution to the issue (e.g., "Adam Smith") as well as the number of days that have passed since the solution was applied (e.g., "2 days ago").

Additionally, section 802 in GUI pane 1200 includes the same fields that this section 802 also has in GUI panes 900, 1000, and 1100, as well as other fields. In particular, section 802 in GUI pane 1200 also includes a menu 1202 for entering and/or selecting a type of resolution for the problem record, which could also be referred to herein as a resolution code. In some implementations, when a particular resolution code is entered or selected via the menu 1202, a GUI pane for closed records may show that particular resolution code when this GUI pane is provided to the client device 602 for display. Additionally or alternatively, when a particular resolution code is entered or selected via the menu 1202, the computing system 600 may store the particular resolution code in the database 608 with respect to the problem record. Nonetheless, the menu 1202 may enable entry and/or selection of various possible resolution codes for the problem record.

By way of example, the menu 1202 shows a "Completed (Fix Applied)" resolution code, which may indicate that the issue was resolved by applying one or more fixes. In another example, the menu 1202 shows a "Risk Accepted (Workaround Applied)" resolution code, which may indicate acceptance of a risk posed by issue and may also indicate that a workaround was applied, such as for at least temporarily resolving the issue. In yet another example, the menu 1202 shows a "Risk Accepted (Workaround Not Applied)" resolution code, which may indicate acceptance of a risk posed by issue and may also indicate that a workaround was not applied. In yet another example, the menu 1202 shows a "Canceled" resolution code, which may indicate that the problem record is canceled. In yet another example, the menu 1202 shows a "Duplicate" resolution code, which may indicate that the problem record is a duplicate of another record. Other examples are also possible.

Further, the graphic 806 in GUI pane 1200 still identifies the various states shown in FIG. 7, but has updated to visually point out the state corresponding to GUI pane 1200. In particular, the graphic 806 includes an updated visual depiction indicating the state to which the problem record is assigned. For example, the "Resolved" identifier of the graphic 806 is highlighted to indicate that the problem record is assigned to the state 708 for resolved record. Other examples are also possible.

In a further aspect, the GUI pane 1200 also includes a "Re-analyze" control 1204 and a "Complete" control 1206.

The "Re-analyze" control 1204 may be configured to cause the problem record to be assigned back to the state 704 for records undergoing root cause analysis. In particular, when the control 1204 is activated, the problem record may transition from the state 708 for resolved records to the state 704 for records undergoing root cause analysis, as described with respect to FIG. 7. Additionally, when the control 1204 is activated, the computing system 600 may provide, to the client device 602 for display, the GUI pane 1000 corresponding to the state 704 for records undergoing root cause analysis. As such, an agent may choose to activate the control 1204 when the agent determines that an applied fix did not sufficiently resolve the issue described in the problem record, or may do so for other reasons.

The "Complete" control 1206 may be configured to cause the problem record to be assigned to state 710 for closed records. In particular, when the control 1206 is activated, the problem record may transition from the state 708 for resolved records to the state 710 for closed records, as described with respect to FIG. 7. Additionally, when the control 1206 is activated, the computing system 600 may provide, to the client device 602 for display, a GUI pane corresponding to the state 710 for closed records. Further, when the control 1206 is activated, the computing system 600 may store, in the database 608, a resolution code that was selected or otherwise entered by way of the menu 1202 in GUI pane 1200, and computing system 600 may cause display of this resolution code in the GUI pane corresponding to the state 710 for closed records, so that an agent reviewing the closed problem record is informed about the reason for closing of the record.

Accordingly, FIGS. 13A-13D show several possible GUI panes that correspond to the state 710 for closed records.

Figure 13A:
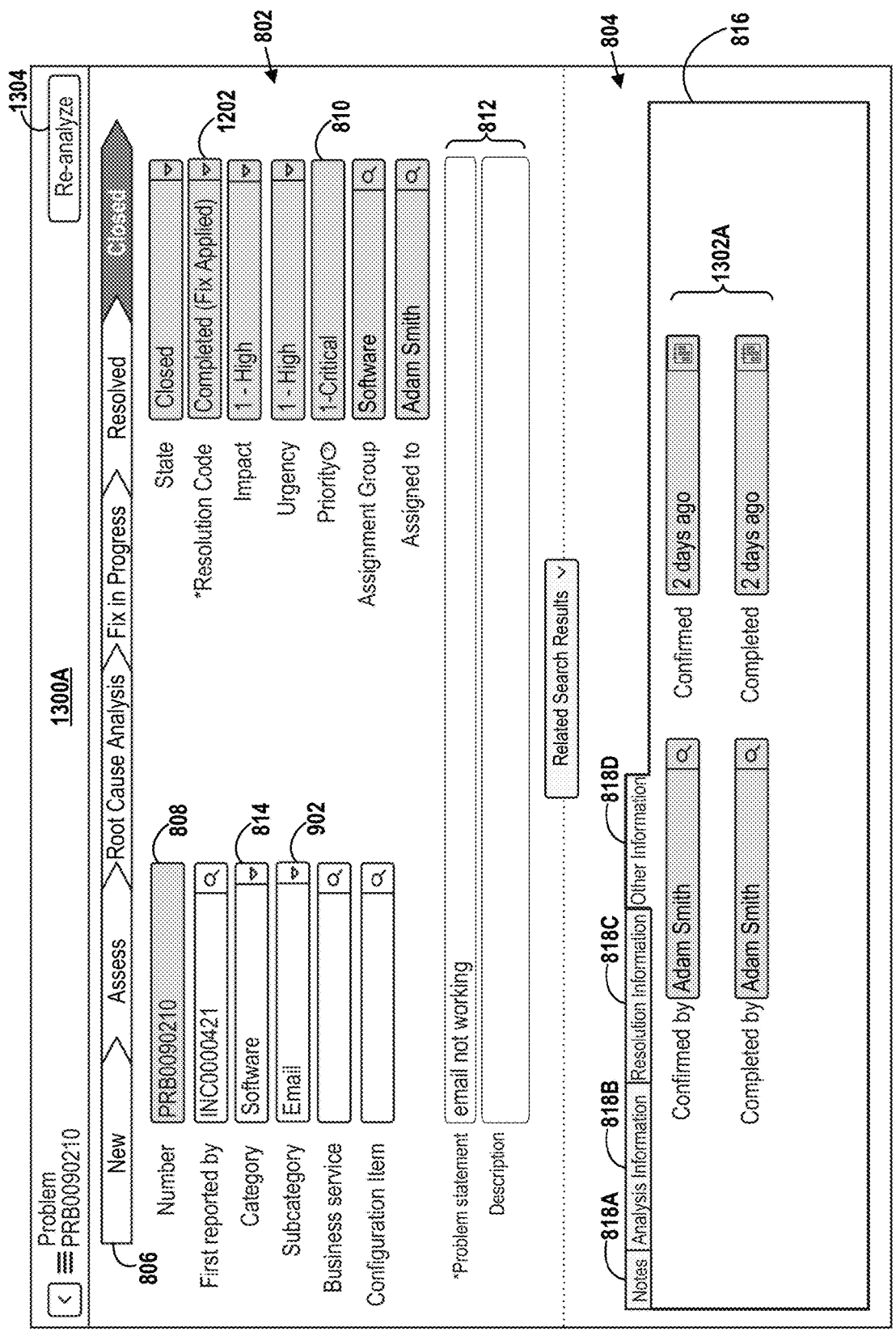
FIG. 13A depicts a graphical user interface pane corresponding to a closed record, in accordance with example embodiments.

In particular, FIG. 13A shows one possible GUI pane 1300A that corresponds to the state 710 for closed records, and that also has the section 802, the section 804, and the graphic 806, among other features. Specifically, GUI pane 1300A might be displayed when the problem record has been designated with a resolution code related to completion, such as through selection of a "Completed (Fix Applied)" resolution code via menu 1202. As such, section 802 in GUI pane 1300A shows that the "Completed (Fix Applied)" resolution code was selected in the menu 1202.

Additionally, section 804 in GUI pane 1300A shows interface feature 1302A within tab 818D. In one case, the interface feature 1302A within tab 818D may be displayed automatically when GUI pane 1300A is displayed. In another case, the interface feature 1302A within tab 818D may be displayed in response to selection of the tab 818D via GUI pane 1300A. In any case, interface feature 1302 may enable review and/or entry of information about closing of the problem record with a resolution code related to completion.

In particular, interface feature 1302A includes a field for specifying an agent that confirmed the problem record (e.g., "Adam Smith"), such as by activating the "Confirm" control 908 of GUI pane 900, for example. Additionally, interface feature 1302A includes a field for specifying a time associated with confirmation of the problem record (e.g., "2 days ago"). Further, interface feature 1302A includes a field for specifying an agent that completed the problem record (e.g., "Adam Smith"), such as by selecting the "Completed (Fix Applied)" resolution code in menu 1202 and activating the "Complete" control 1206, for example. Yet further, interface feature 1302A includes a field for specifying a time associated with completion of the problem record (e.g., "2 days ago"). Other fields are possible as well.

Figure 13B:
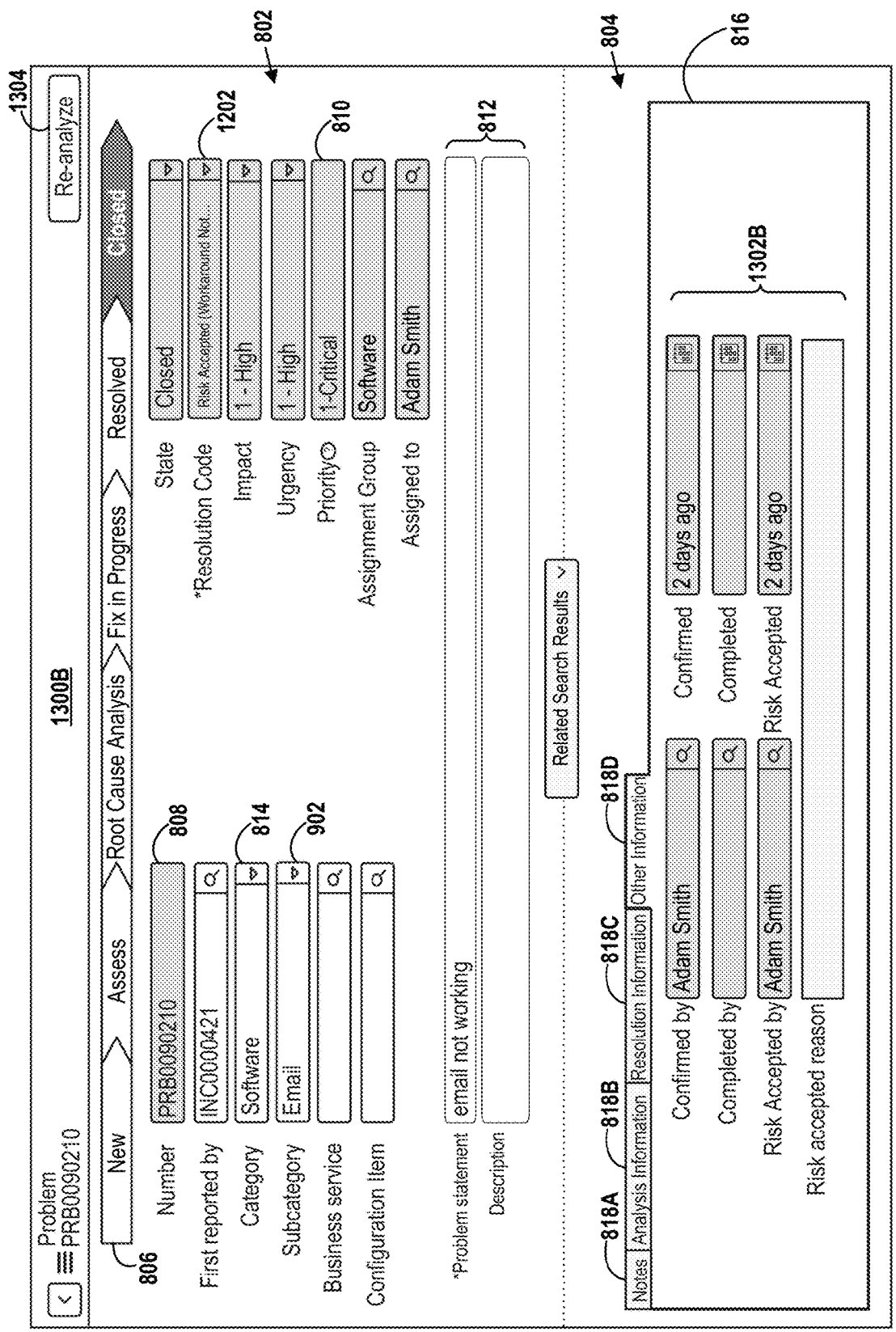
FIG. 13B depicts another graphical user interface pane corresponding to a closed record, in accordance with example embodiments.

FIG. 13B next shows another possible GUI pane 1300B that corresponds to the state 710 for closed records, and that also has the section 802, the section 804, and the graphic 806, among other features. Specifically, GUI pane 1300B might be displayed when the problem record has been designated with a resolution code indicating acceptance of the risk posed by the issue described in the problem record, with that designation being carried out using any of the approaches described herein. As such, section 802 in GUI pane 1300B shows the "Risk Accepted . . . " resolution code in the menu 1202.

Additionally, section 804 in GUI pane 1300B shows interface feature 1302B within tab 818D. In one case, the interface feature 1302B within tab 818D may be displayed automatically when GUI pane 1300B is displayed. In another case, the interface feature 1302B within tab 818D may be displayed in response to selection of the tab 818D via GUI pane 1300B. In any case, interface feature 1302B may enable review and/or entry of information related to closing of the problem record with a resolution code indicating acceptance of the risk.

In particular, interface feature 1302B may include at least some of the fields that are also included in interface feature 1302A of GUI pane 1300A. Additionally, interface feature 1302B includes a field for specifying an agent that accepted the risk posed by the issue described the problem record (e.g., "Adam Smith"), such as by activating the "Risk Accepted" control 1004 of GUI pane 1000, for example. Further, interface feature 1302B includes a field for specifying a time associated with acceptance of the risk (e.g., "2 days ago"). Yet further, interface feature 1302B includes a dialog box that enables specifying more specific reasons for acceptance of the risk. Other fields are possible as well.

Figure 13C:
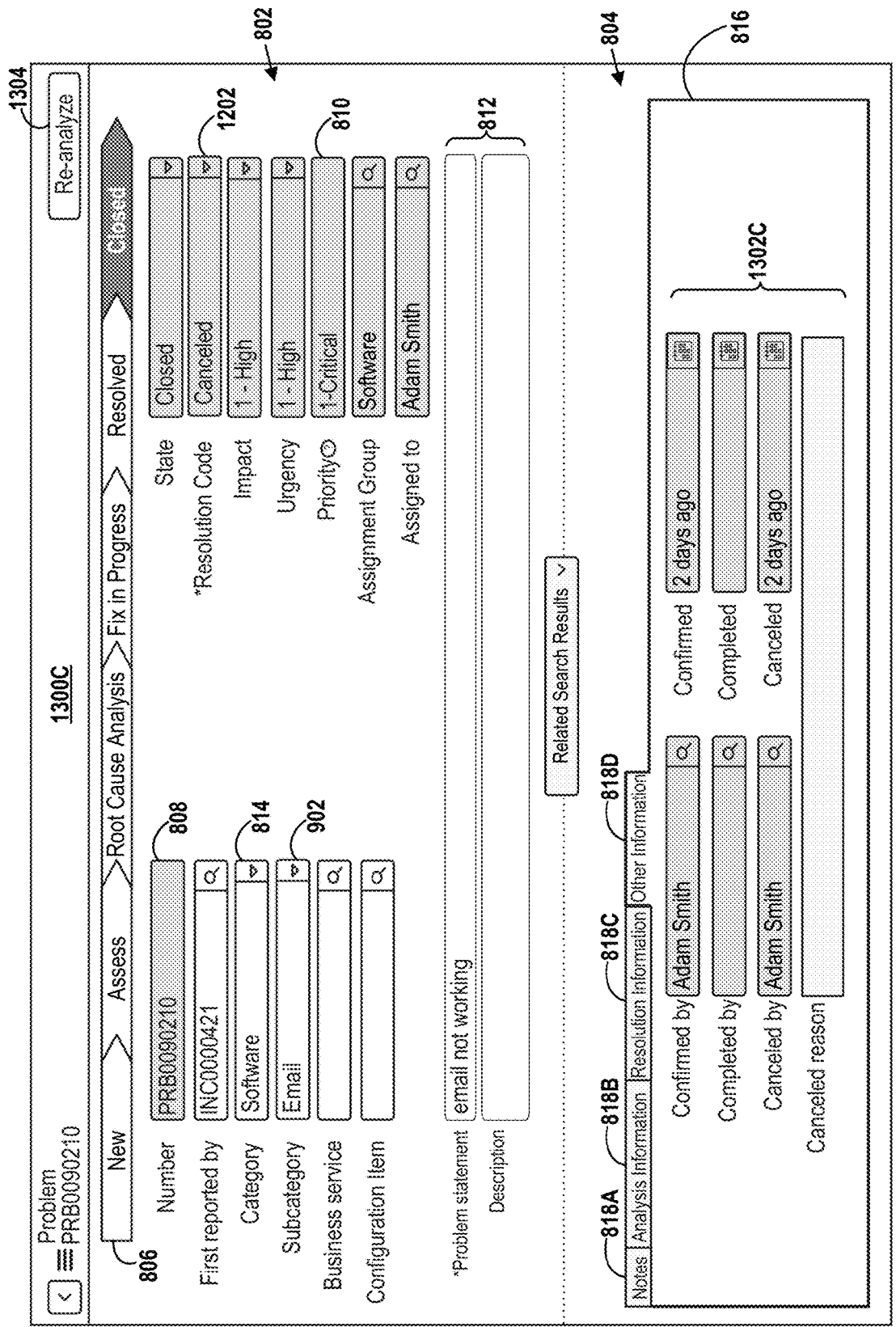
FIG. 13C depicts yet another graphical user interface pane corresponding to a closed record, in accordance with example embodiments.

FIG. 13C next shows yet another possible GUI pane 1300C that corresponds to the state 710 for closed records, and that also has the section 802, the section 804, and the graphic 806, among other features. Specifically, GUI pane 1300C might be displayed when the problem record has been designated with a resolution code indicating that the problem record is canceled, with that designation being carried out using any of the approaches described herein. As such, section 802 in GUI pane 1300C shows the "Canceled" resolution code in menu 1202.

Additionally, section 804 in GUI pane 1300C shows interface feature 1302C within tab 818D. In one case, the interface feature 1302C within tab 818D may be displayed automatically when GUI pane 1300C is displayed. In another case, the interface feature 1302C within tab 818D may be displayed in response to selection of the tab 818D via GUI pane 1300C. In any case, interface feature 1302C may enable review and/or entry of information related to closing of the problem record with a resolution code indicating that the record is canceled.

In particular, interface feature 1302C may include at least some of the fields that are also included in interface feature 1302A of GUI pane 1300A. Additionally, interface feature 1302C includes a field for specifying an agent that canceled the problem record (e.g., "Adam Smith"), such as by activating the "Cancel" control 1006 of GUI pane 1000, for example. Further, interface feature 1302C includes a field for specifying a time associated with cancelation of the problem record (e.g., "2 days ago"). Yet further, interface feature 1302C includes a dialog box that enables specifying more specific reasons for cancelation of the problem record. Other fields are possible as well.

Figure 13D:
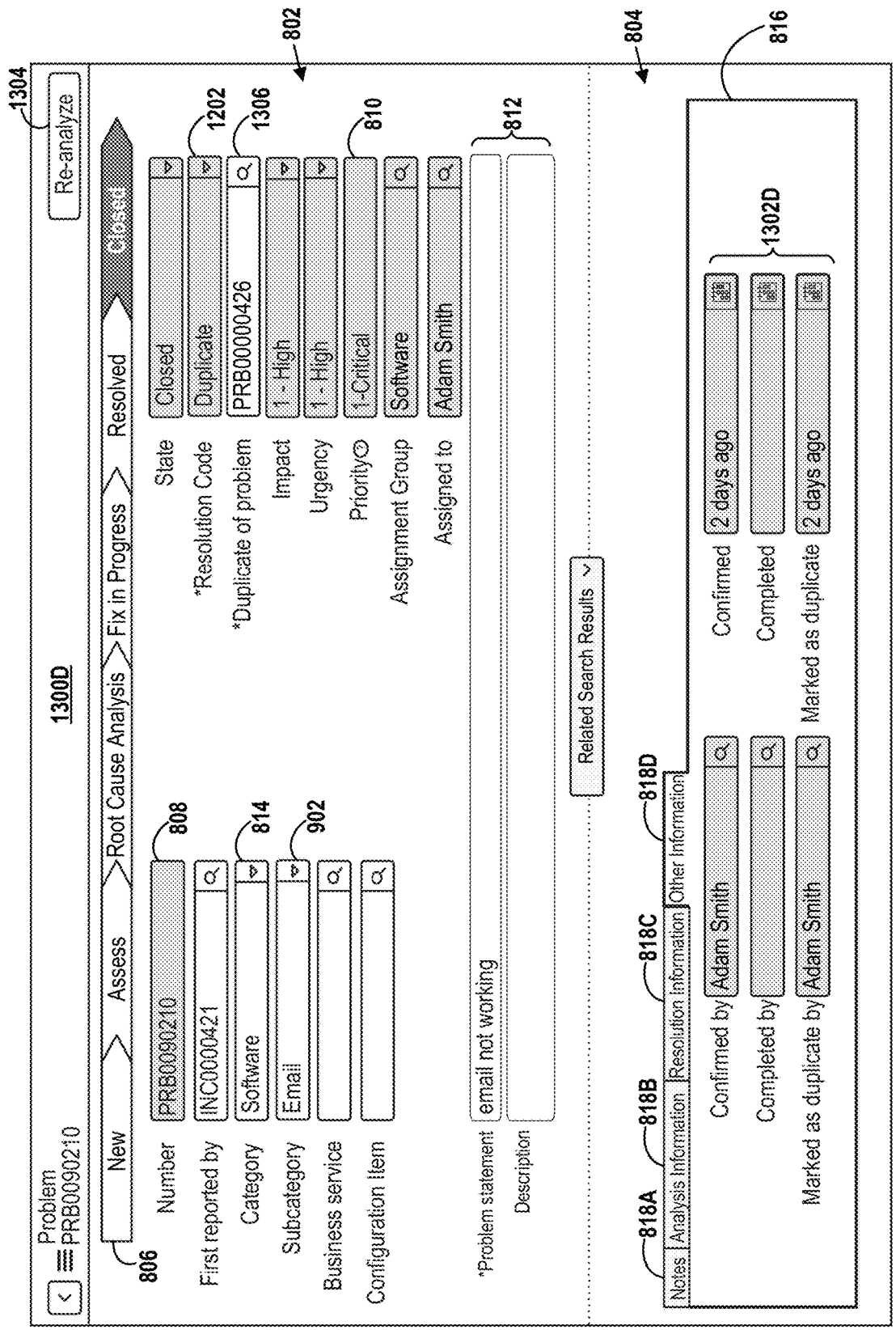
FIG. 13D depicts yet another graphical user interface pane corresponding to a closed record, in accordance with example embodiments.

FIG. 13D next shows yet another possible GUI pane 1300D that corresponds to the state 710 for closed records, and that also has the section 802, the section 804, and the graphic 806, among other features. Specifically, GUI pane 1300D might be displayed when the problem record has been designated with a resolution code indicating that the problem record is a duplicate of another problem record, with that designation being carried out using any of the approaches described herein. As such, section 802 in GUI pane 1300D shows the "Duplicate" resolution code in menu 1202. Moreover, section 802 in GUI pane 1300D includes a field 1306 specifying of a unique identifier of the other problem record of which the displayed problem record is a duplicate (e.g., "PRB00000426").

Additionally, section 804 in GUI pane 1300D shows interface feature 1302D within tab 818D. In one case, the interface feature 1302D within tab 818D may be displayed automatically when GUI pane 1300D is displayed. In another case, the interface feature 1302D within tab 818D may be displayed in response to selection of the tab 818D via GUI pane 1300D. In any case, interface feature 1302D may enable review and/or entry of information related to closing of the problem record with a resolution code indicating that the problem record is a duplicate of another problem record.

In particular, interface feature 1302D may include at least some of the fields that are also included in interface feature 1302A of GUI pane 1300A. Additionally, interface feature 1302D includes a field for specifying an agent that marked the problem record as being a duplicate (e.g., "Adam Smith"), such as by activating the "Mark Duplicate" control 1008 of GUI pane 1000, for example. Further, interface feature 1302C includes a field for specifying a time associated with marking the problem record as being a duplicate (e.g., "2 days ago"). Other fields are possible as well.

Moreover, the graphic 806 in GUI panes 1302A-1302D still identifies the various states shown in FIG. 7, but has updated to visually point out the state corresponding to GUI panes 1302A-1302D. In particular, the graphic 806 includes an updated visual depiction indicating the state to which the problem record is assigned. For example, the "Closed" identifier of the graphic 806 is highlighted to indicate that the problem record is assigned to the state 710 for closed records. Other examples are also possible.

In a further aspect, GUI panes 1302A-1302D each include a "Re-analyze" control 1304, which may be a configurable control.

In particular, the computing system 600 may provide, to the client device 602 for display, an administrative GUI pane (not shown) that includes an interface feature for configuring "Re-analyze" control 1304. Such configuring may involve enabling and/or disabling the control 1304 in any one of the GUI panes 1302A-1302D. Additionally or alternatively, such configuration may involve selecting state transition(s) to be carried out in response to activation of the control 1304. Moreover, the computing system 600 may provide this administrative GUI pane only to certain users of the managed network 300 (e.g., an administrator), such as in response to verifying that a particular user-account requesting display of the administrative GUI pane is authorized to access the administrative representation. Thus, an authorized user could use the administrative GUI pane to configure the disclosed GUI in accordance with preferences of individual(s) (e.g., IT professionals) at an enterprise, among other advantages.

In one example implementation, the "Re-analyze" control 1304 may be configured to cause the problem record to be assigned back to the state 704 for records undergoing root cause analysis. In particular, when the control 1304 is activated, the problem record may transition from the state 710 for closed records to the state 704 for records undergoing root cause analysis, as described with respect to FIG. 7. Additionally, when the control 1304 is activated, the computing system 600 may provide, to the client device 602 for display, the GUI pane 1000 corresponding to the state 704 for records undergoing root cause analysis. As such, an agent may choose to activate the control 1304 when the agent determines that an applied fix did not sufficiently resolve the issue described in the problem record, or may do so for other reasons.

In another example implementation, the "Re-analyze" control 1304 may be configured to cause the problem record to be assigned back to the state 708 for resolved records. In particular, when the control 1304 is activated, the problem record may transition from the state 710 for closed records to the state 708 for resolved records, as described with respect to FIG. 7. Additionally, when the control 1304 is activated, the computing system 600 may provide, to the client device 602 for display, the GUI pane 1200 corresponding to the state 708 for resolved records. As such, an agent may choose to activate the control 1304 when the agent seeks to edit at least some of the information specified in the problem record, or may do so for other reasons. Other implementations and illustrations are possible as well.

In yet a further aspect, the computing system 600 may be configured to provide, to the client device 602 for display, a GUI pane that includes a task-assignment feature enabling assignment of task(s) with respect to one or more of the states described in FIG. 7. For example, the task-assignment feature may enable assignment of a task related to the state 706 for records undergoing root cause analysis. In this example, the GUI pane 1000 may include this task-assignment feature (not shown). Additionally or alternatively, this task-assignment feature might be provided in a GUI pane that is separate from the GUI pane 1000. In any case, assignment of a task using this task-assignment feature could take various forms.

For example, the task-assignment feature may include a field enabling search and/or entry of a unique identifier of a user-account established for a particular agent, so as to assign the task to this user-account and thus effectively assign this task to be performed by that particular agent. In another example, the task-assignment feature may include a field for specifying details of the task to be performed. Other examples are also possible.

Once a task is assigned to a user-account via the task-assignment feature, the computing system 600 may provide an indication of the task assignment to the agent associated with the user-account, such as by providing the indication to a client device of the agent associated with the user-account, for example. Generally, this indication could be provided, for example, in GUI pane(s) displayed on the agent's client device, such as GUI pane(s) corresponding to assigned task(s). For sake of simplicity, these GUI pane(s) may be referred to herein as assigned-task GUI pane(s).

In an example implementation, the assigned-task GUI pane(s) displayed might include one or more fields that show details of the assigned task, as specified via the task-assignment feature, and/or one or more fields that show details about the problem record associated with the assigned task. Additionally or alternatively, the assigned-task GUI pane(s) might include one or more fields that enable entry of information related to the assigned task. And when such information related to the assigned task is entered, the computing system 600 might also cause one or more of the GUI panes 800-1300D to display this entered information, so that an agent reviewing the problem record could have this information during management of the problem record. For example, the assigned-task GUI pane(s) may include fields that enable entry of information that might then be displayed within one or more the tabs 818A-818D of interface feature 816. Other examples are also possible.

VIII. Example Operations

FIG. 14 is a flow chart illustrating an example embodiment. The process illustrated by FIG. 14 may be carried out by a computing system, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 14 may be simplified by the removal of any one or more of the features shown therein. Further, these embodiments may be combined with features, aspects, and/or implementations of any of the previous figures or otherwise described herein.

Block 1400 may involve providing, by a computing system and to a client device associated with a managed network, a first pane from among a plurality of graphical user interface panes, where the computing system includes a database disposed within a computational instance of a remote network management platform that manages the managed network, where the database is configured to store a plurality of records related to issues with configuration items of the managed network, each record assigned to one of a plurality of states including: a first state for newly-opened records, a second state for records undergoing assessment, a third state for records undergoing root cause analysis, a fourth state for records with a fix in progress, a fifth state for resolved records, and a sixth state for closed records, where each of the graphical user interface panes corresponds to one of the plurality of states for a particular record of the plurality of records, where the first pane corresponds to the first state, and where the first pane represents a unique identifier of the particular record, a priority of the particular record, a description of the particular record, and a first control configured to cause the particular record to be assigned to the second state.

Block 1402 may involve providing, by the computing system and to the client device, a second pane corresponding to the second state, where the second pane represents the unique identifier, the priority, the description, a category of the particular record, a second control configured to cause the particular record to be assigned to the third state, and a third control configured to cause the particular record to be assigned to the sixth state.

Block 1404 may involve providing, by the computing system and to the client device, a third pane corresponding to the third state, where the third pane represents the unique identifier, the priority, the description, the category, a first dialog box for entering a summary of a particular issue associated with the particular record, a fourth control configured to cause the particular record to be assigned to the fourth state, and a fifth control configured to cause the particular record to be assigned to the sixth state.

Block 1406 may involve providing, by the computing system and to the client device, a fourth pane corresponding to the fourth state, where the fourth pane represents the unique identifier, the priority, the description, the category, a second dialog box for entering a summary of a solution used to resolve the particular issue associated with the particular record, a sixth control configured to cause the particular record to be assigned to the fifth state, and a seventh control configured to cause the particular record to be assigned to the sixth state.

Block 1408 may involve providing, by the computing system and to the client device, a fifth pane corresponding to the fifth state, where the fifth pane represents the unique identifier, the priority, the description, the category, a menu for entering a type of resolution for the particular record, an eighth control configured to cause the particular record to be assigned to the sixth state, and a ninth control configured to cause the particular record to be assigned to the third state.

Block 1410 may involve providing, by the computing system and to the client device, a sixth pane corresponding to the sixth state, where the sixth pane represents the unique identifier, the priority, the description, and the category.

In some embodiments, one or more server devices of the computing system may carry out the process of blocks 1400-1410.

In some embodiments, each of the graphical user interface panes may represent a graphic identifying the plurality of states, the graphic including a visual depiction indicating one of the plurality of states to which the particular record is assigned.

In such embodiments, the graphic identifying the plurality of states may involve the graphic including a list of state identifiers representative of the plurality of states, and the state identifiers may be ordered within the list according to a sequence of the plurality of states.

In some embodiments, each of the graphical user interface panes may represent a plurality of tabs, where a first tab, of the plurality of tabs, may be selectable to provide access to the first dialog box, and where a second tab, of the plurality of tabs, may be selectable to provide access to the second dialog box.

In such embodiments, each of the graphical user interface panes may include a first section and a second section, where the first section represents at least the unique identifier, the priority, and the description, and where the second section represents the plurality of tabs.

Additionally or alternatively, in such embodiments, a third tab, of the plurality of tabs, may be selectable to provide access to a third dialog box for entering notes about the particular record, and a fourth tab, of the plurality of tabs, may be selectable to provide access to one or more fields for including other information related to closing of the particular record.

In some embodiments, one or both of the first and second panes may also represent a first field enabling selection of the category, where selection of the category in the first field may cause the second pane to also represent a second field enabling selection of a subcategory from a list of subcategories, and where the list of subcategories in the second field may be based on the category selected in the first field.

In some embodiments, the sixth pane may also represent a tenth control configured to cause the particular record to be assigned to the third state or the fifth state.

In some embodiments, the computing system may be further configured to: provide, to the client device, an administrative graphical user interface pane that may include an interface feature for enabling or disabling a tenth control on the sixth pane, where the tenth control, when enabled, may be configured to cause the particular record to be assigned to the third state or the fifth state.

In some embodiments, the sixth pane may also represent a resolution-code identifier indicating the type of resolution for the particular record.

In such embodiments, the type of resolution indicated by the resolution-code identifier may be entered by way of the menu represented by fifth pane. In this regard, the type of resolution might indicate (i) that the particular record is a duplicate of another record from the plurality of records, (ii) that the particular record is cancelled, (iii) acceptance of a risk posed by the particular issue associated with the particular record, or (iv) that resolution for the particular record is complete.

Additionally or alternatively, in such embodiments, the third control may also be configured to cause the resolution-code identifier to indicate, as the type of resolution for the particular record, (i) that the particular record is a duplicate of another record from the plurality of records, or (ii) that the particular record is cancelled.

Additionally or alternatively, in such embodiments, the fifth control may also be configured to cause the resolution-code identifier to indicate, as the type of resolution for the particular record, (i) that the particular record is a duplicate of another record from the plurality of records, (ii) that the particular record is cancelled, or (iii) acceptance of a risk posed by the particular issue associated with the particular record.

Additionally or alternatively, in such embodiments, the seventh control may also be configured to cause the resolution-code identifier to indicate, as the type of resolution for the particular record, acceptance of a risk posed by the particular issue associated with the particular record.

Additionally or alternatively, in such embodiments, the eighth control may also be configured to cause the resolution-code identifier to indicate, as the type of resolution for the particular record, that resolution for the particular record is complete.

Additionally or alternatively, in such embodiments, the unique identifier of the particular record may be a first unique identifier, the resolution-code identifier may indicate, as the type of resolution for the particular record, that the particular record is a duplicate of another record from the plurality of records, and the sixth pane may also represents a second unique identifier of the other record of which the particular record is a duplicate.

In some embodiments, the computing system may be further configured to: provide, to the client device, a seventh pane including an interface feature that enables assignment, to a user-account associated with the managed network, of a task related to the particular record undergoing root cause analysis in accordance with the third state.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
a database disposed within a computational instance of a remote network management platform that manages a managed network, wherein the database is configured to store a plurality of records related to issues with configuration items of the managed network, each record assigned to one of a plurality of states including: a first state for newly-opened records, a second state for records undergoing assessment, a third state for records undergoing root cause analysis, a fourth state for records with a fix in progress, a fifth state for resolved records, and a sixth state for closed records; and
one or more server devices, associated with the computational instance, and configured to generate and provide graphical user interface panes to a client device associated with the managed network, each of the graphical user interface panes corresponding to one of the plurality of states for a particular record of the plurality of records, the graphical user interface panes including:
a first pane corresponding to the first state, wherein the first pane represents a unique identifier of the particular record, a priority of the particular record, a description of the particular record, and a first control configured to cause the particular record to be assigned to the second state;

a second pane corresponding to the second state, wherein the second pane represents the unique identifier, the priority, the description, a category of the particular record, a second control configured to cause the particular record to be assigned to the third state, and a third control configured to cause the particular record to be assigned to the sixth state;

a third pane corresponding to the third state, wherein the third pane represents the unique identifier, the priority, the description, the category, a first dialog box for entering a summary of a particular issue associated with the particular record, a fourth control configured to cause the particular record to be assigned to the fourth state, and a fifth control configured to cause the particular record to be assigned to the sixth state;

a fourth pane corresponding to the fourth state, wherein the fourth pane represents the unique identifier, the priority, the description, the category, a second dialog box for entering a summary of a solution used to resolve the particular issue associated with the particular record, a sixth control configured to cause the particular record to be assigned to the fifth state, and a seventh control configured to cause the particular record to be assigned to the sixth state;

a fifth pane corresponding to the fifth state, wherein the fifth pane represents the unique identifier, the priority, the description, the category, a menu for entering a type of resolution for the particular record, an eighth control configured to cause the particular record to be assigned to the sixth state, and a ninth control configured to cause the particular record to be assigned to the third state; and a sixth pane corresponding to the sixth state, wherein the sixth pane represents the unique identifier, the priority, the description, and the category.

2. The computing system of claim 1, wherein each of the graphical user interface panes represents a graphic identifying the plurality of states, the graphic including a visual depiction indicating one of the plurality of states to which the particular record is assigned.

3. The computing system of claim 2, wherein the graphic identifying the plurality of states comprises the graphic including a list of state identifiers representative of the plurality of states, and wherein the state identifiers are ordered within the list according to a sequence of the plurality of states.

4. The computing system of claim 1, wherein each of the graphical user interface panes represents a plurality of tabs, wherein a first tab, of the plurality of tabs, is selectable to provide access to the first dialog box, and wherein a second tab, of the plurality of tabs, is selectable to provide access to the second dialog box.

5. The computing system of claim 4, wherein each of the graphical user interface panes include a first section and a second section, wherein the first section represents at least the unique identifier, the priority, and the description, and wherein the second section represents the plurality of tabs.

6. The computing system of claim 4, wherein a third tab, of the plurality of tabs, is selectable to provide access to a third dialog box for entering notes about the particular record, and wherein a fourth tab, of the plurality of tabs, is selectable to provide access to one or more fields for including other information related to closing of the particular record.

7. The computing system of claim 1, wherein one or both of the first and second panes also represent a first field enabling selection of the category, wherein selection of the category in the first field causes the second pane to also represent a second field enabling selection of a subcategory from a list of subcategories, and wherein the list of subcategories in the second field is based on the category selected in the first field.

8. The computing system of claim 1, wherein the sixth pane also represents a tenth control configured to cause the particular record to be assigned to the third state or the fifth state.

9. The computing system of claim 1, wherein the one or more server devices are further configured to:
provide, to the client device, an administrative graphical user interface pane that includes an interface feature for enabling or disabling a tenth control on the sixth pane, wherein the tenth control, when enabled, is configured to cause the particular record to be assigned to the third state or the fifth state.

10. The computing system of claim 1, wherein the sixth pane also represents a resolution-code identifier indicating the type of resolution for the particular record.

11. The computing system of claim 10, wherein the type of resolution indicated by the resolution-code identifier is entered by way of the menu represented by fifth pane.

12. The computing system of claim 11, wherein the type of resolution indicates (i) that the particular record is a duplicate of another record from the plurality of records, (ii) that the particular record is cancelled, (iii) acceptance of a risk posed by the particular issue associated with the particular record, or (iv) that resolution for the particular record is complete.

13. The computing system of claim 10, wherein the third control is also configured to cause the resolution-code identifier to indicate, as the type of resolution for the particular record, (i) that the particular record is a duplicate of another record from the plurality of records, or (ii) that the particular record is cancelled.

14. The computing system of claim 10, wherein the fifth control is also configured to cause the resolution-code identifier to indicate, as the type of resolution for the particular record, (i) that the particular record is a duplicate of another record from the plurality of records, (ii) that the particular record is cancelled, or (iii) acceptance of a risk posed by the particular issue associated with the particular record.

15. The computing system of claim 10, wherein the seventh control is also configured to cause the resolution-code identifier to indicate, as the type of resolution for the particular record, acceptance of a risk posed by the particular issue associated with the particular record.

16. The computing system of claim 10, wherein the eighth control is also configured to cause the resolution-code identifier to indicate, as the type of resolution for the particular record, that resolution for the particular record is complete.

17. The computing system of claim 10, wherein the unique identifier of the particular record is a first unique identifier, wherein the resolution-code identifier indicates, as the type of resolution for the particular record, that the particular record is a duplicate of another record from the plurality of records, and wherein the sixth pane also represents a second unique identifier of the other record of which the particular record is a duplicate.

18. The computing system of claim 1, wherein the one or more server devices are further configured to:
provide, to the client device, a seventh pane including an interface feature that enables assignment, to a user-account associated with the managed network, of a task related to the particular record undergoing root cause analysis in accordance with the third state.

19. A method comprising:

providing, by a computing system and to a client device associated with a managed network, a first pane from among a plurality of graphical user interface panes, wherein the computing system includes a database disposed within a computational instance of a remote network management platform that manages the managed network, wherein the database is configured to store a plurality of records related to issues with configuration items of the managed network, each record assigned to one of a plurality of states including: a first state for newly-opened records, a second state for records undergoing assessment, a third state for records undergoing root cause analysis, a fourth state for records with a fix in progress, a fifth state for resolved records, and a sixth state for closed records, wherein each of the graphical user interface panes corresponds to one of the plurality of states for a particular record of the plurality of records, wherein the first pane corresponds to the first state, and wherein the first pane represents a unique identifier of the particular record, a priority of the particular record, a description of the particular record, and a first control configured to cause the particular record to be assigned to the second state;

providing, by the computing system and to the client device, a second pane corresponding to the second state, wherein the second pane represents the unique identifier, the priority, the description, a category of the particular record, a second control configured to cause the particular record to be assigned to the third state, and a third control configured to cause the particular record to be assigned to the sixth state;

providing, by the computing system and to the client device, a third pane corresponding to the third state, wherein the third pane represents the unique identifier, the priority, the description, the category, a first dialog box for entering a summary of a particular issue associated with the particular record, a fourth control configured to cause the particular record to be assigned to the fourth state, and a fifth control configured to cause the particular record to be assigned to the sixth state;

providing, by the computing system and to the client device, a fourth pane corresponding to the fourth state, wherein the fourth pane represents the unique identifier, the priority, the description, the category, a second dialog box for entering a summary of a solution used to resolve the particular issue associated with the particular record, a sixth control configured to cause the particular record to be assigned to the fifth state, and a seventh control configured to cause the particular record to be assigned to the sixth state;

providing, by the computing system and to the client device, a fifth pane corresponding to the fifth state, wherein the fifth pane represents the unique identifier, the priority, the description, the category, a menu for entering a type of resolution for the particular record, an eighth control configured to cause the particular record to be assigned to the sixth state, and a ninth control configured to cause the particular record to be assigned to the third state; and providing, by the computing system and to the client device, a sixth pane corresponding to the sixth state, wherein the sixth pane represents the unique identifier, the priority, the description, and the category.

20. An article of manufacture including a non-transitory computer-readable medium, having stored thereon program instructions that, upon execution by a computing system that includes a database disposed within a computational instance of a remote network management platform that manages a managed network, cause the computing system to perform operations comprising:

providing, to a client device associated with the managed network, a first pane from among a plurality of graphical user interface panes, wherein the database is configured to store a plurality of records related to issues with configuration items of the managed network, each record assigned to one of a plurality of states including: a first state for newly-opened records, a second state for records undergoing assessment, a third state for records undergoing root cause analysis, a fourth state for records with a fix in progress, a fifth state for resolved records, and a sixth state for closed records, wherein each of the graphical user interface panes corresponds to one of the plurality of states for a particular record of the plurality of records, wherein the first pane corresponds to the first state, and wherein the first pane represents a unique identifier of the particular record, a priority of the particular record, a description of the particular record, and a first control configured to cause the particular record to be assigned to the second state;

providing, to the client device, a second pane corresponding to the second state, wherein the second pane represents the unique identifier, the priority, the description, a category of the particular record, a second control configured to cause the particular record to be assigned to the third state, and a third control configured to cause the particular record to be assigned to the sixth state;

providing, to the client device, a third pane corresponding to the third state, wherein the third pane represents the unique identifier, the priority, the description, the category, a first dialog box for entering a summary of a particular issue associated with the particular record, a fourth control configured to cause the particular record to be assigned to the fourth state, and a fifth control configured to cause the particular record to be assigned to the sixth state;

providing, to the client device, a fourth pane corresponding to the fourth state, wherein the fourth pane represents the unique identifier, the priority, the description, the category, a second dialog box for entering a summary of a solution used to resolve the particular issue associated with the particular record, a sixth control configured to cause the particular record to be assigned to the fifth state, and a seventh control configured to cause the particular record to be assigned to the sixth state;

providing, to the client device, a fifth pane corresponding to the fifth state, wherein the fifth pane represents the unique identifier, the priority, the description, the category, a menu for entering a type of resolution for the particular record, an eighth control configured to cause the particular record to be assigned to the sixth state, and a ninth control configured to cause the particular record to be assigned to the third state; and providing, to the client device, a sixth pane corresponding to the sixth state, wherein the sixth pane represents the unique identifier, the priority, the description, and the category.

* * * * *